(12) United States Patent
Armstrong

(10) Patent No.: US 11,606,617 B2
(45) Date of Patent: Mar. 14, 2023

(54) METHOD, APPARATUS AND COMPUTER PROGRAM PRODUCT FOR PRESENTING A SPORTING EVENT

(71) Applicant: AUGUSTA NATIONAL, INC., Augusta, GA (US)

(72) Inventor: William Michael Armstrong, Martinez, GA (US)

(73) Assignee: Augusta National, Inc., Augusta, GA (US)

( * ) Notice: Subject to any disclaimer, the term of this patent is extended or adjusted under 35 U.S.C. 154(b) by 0 days.

(21) Appl. No.: 17/194,469

(22) Filed: Mar. 8, 2021

(65) Prior Publication Data

US 2021/0289265 A1  Sep. 16, 2021

Related U.S. Application Data

(60) Provisional application No. 62/988,274, filed on Mar. 11, 2020.

(51) Int. Cl.
| | |
|---|---|
| *H04N 7/173* | (2011.01) |
| *H04N 21/472* | (2011.01) |
| *G06F 16/95* | (2019.01) |
| *H04N 21/81* | (2011.01) |
| *H04N 21/2187* | (2011.01) |

(52) U.S. Cl.
CPC ....... *H04N 21/47217* (2013.01); *G06F 16/95* (2019.01); *H04N 21/2187* (2013.01); *H04N 21/8173* (2013.01)

(58) Field of Classification Search
CPC .................... A63B 24/0003; A63B 2024/0015
USPC ........................................................... 725/87
See application file for complete search history.

(56) References Cited

U.S. PATENT DOCUMENTS

| | | | |
|---|---|---|---|
| 2013/0085018 A1* | 4/2013 | Jensen | A63F 13/812 473/404 |
| 2013/0296048 A1* | 11/2013 | Jeffery | A63F 13/355 463/31 |
| 2020/0222757 A1* | 7/2020 | Yang | G09B 5/06 |

* cited by examiner

*Primary Examiner* — Jivka A Rabovianski
(74) *Attorney, Agent, or Firm* — Moore & Van Allen PLLC; Michael M. McCraw

(57) ABSTRACT

Provided herein is a method, apparatus and computer program product for gathering and presenting information associated with a sporting event to a user in a manner tailored to a user's preferences. Methods include: receiving a plurality of video segments associated with at least one subject; providing for display of at least one of the plurality of video segments; providing for selection of at least one video segment not associated with the at least one subject in response to the plurality of video segments having been played or skipped; providing for display of the at least one video segment not associated with the at least one subject; and following or superseding display of the at least one video segment not associated with the at least one subject with display of a new video segment in response to receiving the new video segment associated with the at least one subject.

20 Claims, 20 Drawing Sheets

METHOD, APPARATUS AND COMPUTER PROGRAM PRODUCT FOR PRESENTING A SPORTING EVENT

CROSS-REFERENCE TO RELATED APPLICATIONS

This application claims priority to U.S. Provisional Application Ser. No. 62/988,274, filed on Mar. 11, 2020, the contents of which are hereby incorporated by reference in their entirety.

TECHNOLOGICAL FIELD

Example embodiments of the present invention relate generally to the presentation of information on a display, and more particularly, to a method, apparatus, and computer program product to gather and present information associated with a sporting event to a user in a manner tailored to a user's preferences.

BACKGROUND

Sporting events have provided entertainment for centuries. While sporting events had historically only been available for in-person viewing, new ways of following sporting events (both live and previously played) have become commonplace. Observing sporting events has progressed from exclusively in-person viewing, to print media reading after an event, to radio broadcasts of live events, and to being able to watch recorded footage of a sporting event. Generally, television broadcasts of sporting events provide a lens through which a sporting event is presented to an audience. Television broadcasters have identified aspects of different types of sporting events that appeal to a wide audience and present their broadcasts accordingly. When a sporting event is only available for viewing on a single channel or single network, the viewer is limited to what the broadcaster has determined to be the most engaging views and video of the sporting event. This approach is well suited for many sports; however, there are sporting events where events of interest to certain viewers are not presented.

SUMMARY

In general, an example embodiment of the present invention provides a method of the presentation of information on a display, and more particularly, a method, apparatus, and computer program product that gathers and presents information associated with a sporting event to a user in a manner tailored to a user's preferences. In particular, the method of example embodiments includes: receiving user input identifying at least one subject; receiving a plurality of video segments associated with the at least one subject; providing for display of at least one of the plurality of video segments associated with the at least one subject; providing for selection of at least one video segment that is not associated with the at least one subject in response to the plurality of video segments associated with the at least one subject having been played or skipped; providing for display of the at least one video segment that is not associated with the at least one subject; receiving a new video segment associated with the at least one subject while providing for display of the at least one video segment that is not associated with the at least one subject; following or superseding display of the at least one video segment that is not associated with the at least one subject with display of the new video segment in response to receiving the new video segment associated with the at least one subject.

Methods of example embodiments may include: providing for display of a plurality of user interface elements in a list adjacent to the at least one of the plurality of video segments provided for display, where the plurality of user interface elements corresponds to respective video segments of the plurality of video segments associated with the at least one subject; and adding to the list a user interface element corresponding to a new video segment in response to receiving the new video segment associated with the at least one subject. The at least one subject may include at least one golfer, where the plurality of video segments associated with the at least one subject includes a plurality of video segments of golf shots of the at least one golfer. Receiving the plurality of video segments associated with the at least one subject includes receiving the plurality of video segments of golf shots of the at least one golfer during a golfing event. Receiving the new video segment associated with the at least one subject includes receiving the new video segment associated with the at least one golfer in response to the at least one golfer completing a golf shot.

According to some embodiments, providing for selection of at least one video segment that is not associated with the at least one subject in response to the plurality of video segments associated with the at least one subject having been played or skipped includes providing for selection of at least one video segment that is not associated with the at least one subject in response to all video segments of the plurality of video segments of golf shots of a current round of the golfing event having occurred in the past for the at least one subject having been played or skipped by the user.

Embodiments provided herein include a computer program product having at least one non-transitory computer-readable storage medium having computer-executable program code portions stored therein, the computer-executable program code portions including program code instructions configured to: provide for display of a plurality of subjects; receive user input identifying at least one subject of the plurality of subjects; determine a subset of video segments of a plurality of video segments, each video segment of the plurality of video segments including video segment information, where the video segment information includes an indication of a subject of the video segment and a context of the video segment, where the subset of video segments is determined based on the subject of a respective video segment corresponding to the at least one subject; and provide for display of the subset of video segments in an order based, at least in part, on respective contexts of video segments of the subset of video segments. The plurality of subjects includes a plurality of athletes, where each video segment of the plurality of video segments includes a video segment of a respective athlete performing an athletic action. The athletic action may include striking a golf ball with a golf club.

The context of a respective video segment includes at least a stroke number, where the program code instructions to provide for display of the subset of video segments in an order based, at least in part, on respective context of video segments of the subset of video segments are further configured to provide for display of the subset of video segments in an order based, at least in part, on the stroke number. Embodiments may include program code instructions to: during display of a respective video segment of the subset of video segments, provide for display of a map view adjacent to the display of the respective video segment, where the map view includes a location where the respective video segment was captured. Embodiments may include program code instructions to provide for display on the map view of a trajectory of the golf ball struck with the golf club in the respective video segment.

According to some embodiments, the program code instructions configured to provide for display of the subset of video segments in an order based, at least in part, on a respective context of video segments of the subset of video segments are further configured to provide for display of the subset of video segments based, at least in part, on the context of the respective video segments satisfying the predetermined criteria. The plurality of subjects may include golfers, where each of the plurality of video segments includes a video segment of a respective golfer striking a golf ball with a golf club as a golf shot, where the context of the respective video segment includes information associated with the golf shot. The predetermined criteria of some embodiments includes a type of golf shot including: a putt made from a predefined distance from a hole or greater; a golf shot with a golf ball landing within a predefined closeness distance to the hole from at least a predefined shot distance from the hole; or a golf shot made into the hole to achieve two or more under par.

Embodiments provided herein include an apparatus including a display, where the apparatus is configured to provide for display of a plurality of subjects, where the subjects include golfers; receive user input identifying at least one subject; determine, from a plurality of video segments, a subset of video segments corresponding to the at least one identified subject, where the plurality of video segments includes video segments of golf strokes, where the subset of video segments corresponding to the at least one identified subject includes video segments of golf strokes for at least one identified golfer corresponding to the at least one identified subject; provide for display in a display window of the subset of video segments corresponding to the at least one identified subject, where the subset of video segments is provided for display in an order corresponding to an order of the golf strokes for the at least one identified golfer; provide for display of a map view window adjacent to the display window on the display; provide for display of a trajectory of a golf ball in the map view corresponding to a golf stroke of a respective video segment, where the trajectory of the golf ball in the map view provides a visual indication of a location and flight of the golf ball on a hole of a golf course.

According to some embodiments, the apparatus is further caused to: provide for selection of at least one video segment that is not associated with the at least one identified subject in response to the subset of video segments associated with the at least one identified subject having been played or skipped; and provide for display of the at least one video segment that is not associated with the at least one subject. The apparatus of some embodiments is caused to receive a new video segment associated with the at least one identified subject; and provide for display of the new video segment. Causing the apparatus to provide for display of the new video segment may include causing the apparatus to follow or supersede display of the at least one video segment that is not associated with the at least one identified subject. Causing the apparatus to receive the new video segment associated with the at least one subject may include causing the apparatus to receive the new video segment associated with the at least one golfer in response to the at least one golfer completing a golf shot.

Embodiments provided herein may include a method including: receiving a plurality of video segments, each video segment including video segment information, where the video segment information includes an indication of a subject of the video segment and a context of the video segment; determining a subset of the plurality of video segments based, at least in part, on at least one of the subject or the context of the respective video segments; providing for display of a plurality of user interface elements, where each user interface element corresponds to a video segment of the subset of the plurality of video segments; and providing for display of a selected video segment in response to receiving a selection of a user interface element corresponding to the selected video segment. Each video segment may include movement of an object from a first location to a second location. Providing for display of a selected video segment my optionally include providing for display of a map view of the object traveling from the first location to the second location.

According to some embodiments, the map view includes an elevated view of a hole of a golf course, where the object includes a golf ball, and where providing for display of a map view of the object traveling from the first location to the second location includes providing for display of a trajectory of the golf ball from the first location to the second location. The map view may be provided adjacent to the display of the selected video segment. The context of the video segment includes at least one of a hole number of a golf course, a stroke number, or a ranking of the subject of the video segment. The subject of the video segment includes an athlete performing an athletic action in the video segment.

According to some embodiments, determining the subset of the plurality of video segments includes determining the subset of the plurality of video segments having at least one common subject or at least one common context. Methods may include receiving a user input identifying at least one subject, where determining the subset of the plurality of video segments includes determining the subset of the plurality of video segments including the at least one identified subject. The context of the video segments of the subset of video segments includes a stroke number, where providing for display of a selected video segment in response to receiving selection of a user interface element corresponding to the selected video segment may include providing for display of a second plurality of video segments of the subset of plurality of video segments in an order determined based on the context of the second plurality of video segments.

DRAWINGS

The patent or application file contains at least one drawing executed in color. Copies of this patent or patent application publication with color drawing(s) will be provided by the Office upon request and payment of the necessary fee. Having thus described embodiments of the invention in general terms, reference will now be made to the accompanying drawings, which are not necessarily drawn to scale, and wherein.

Figure 19:
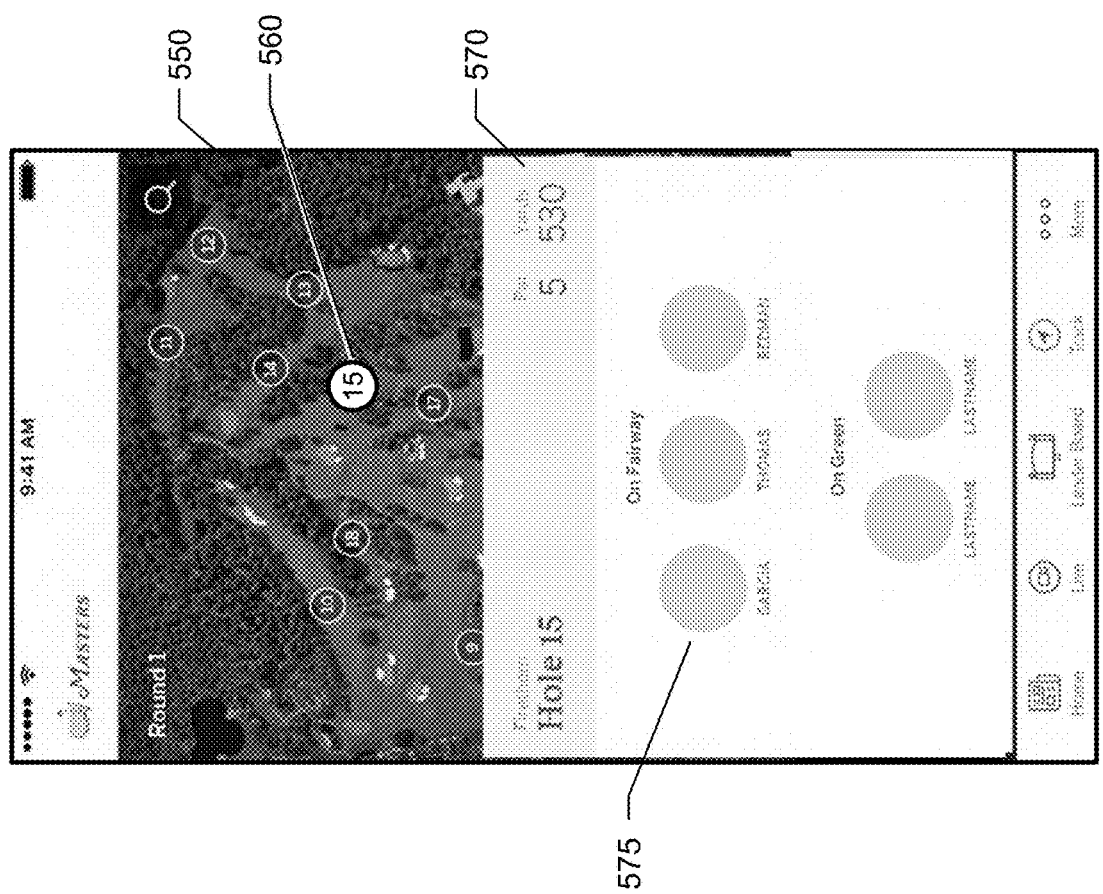
Figure 20:
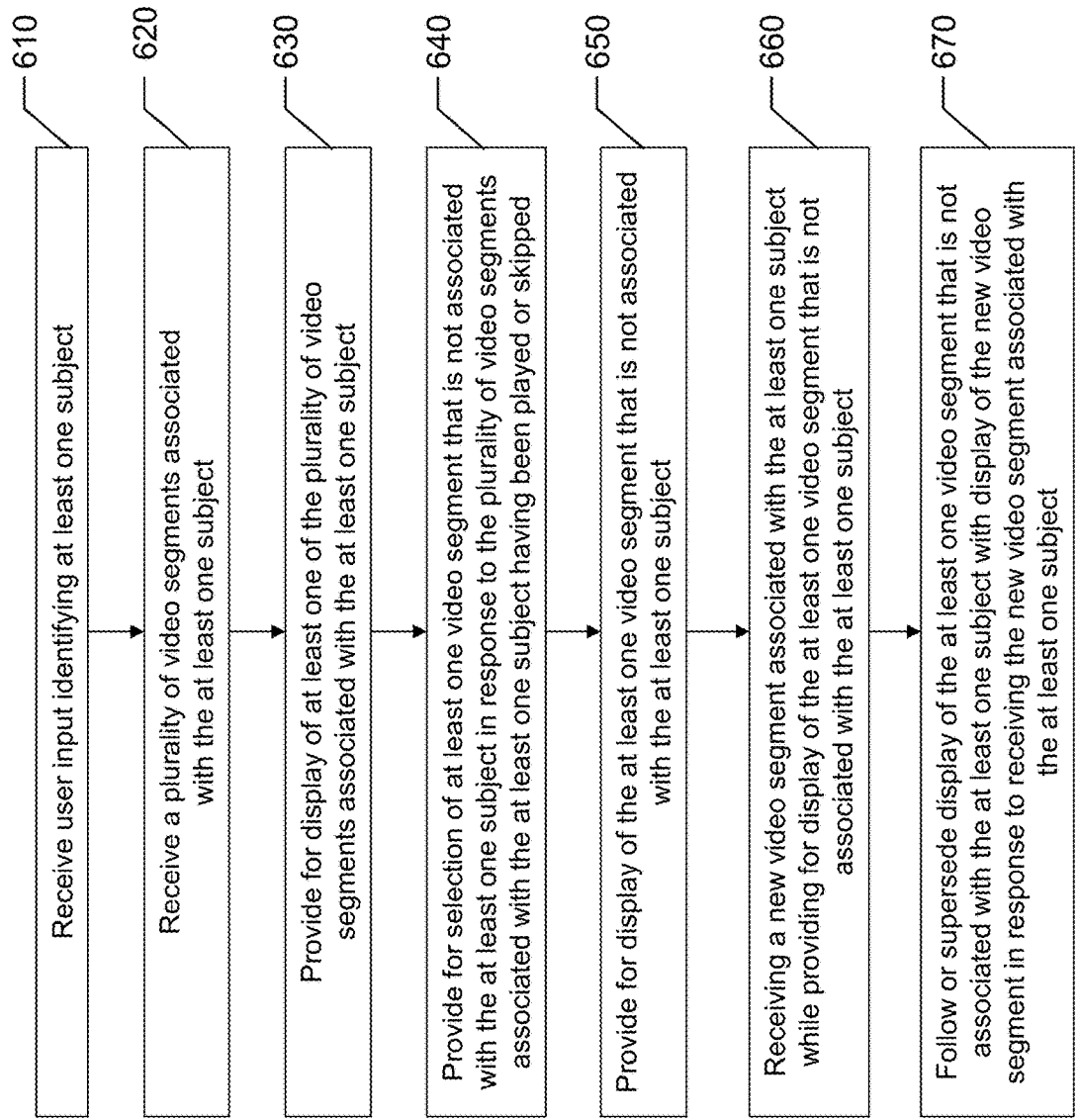

FIG. 19 illustrates an expanded hole card including icons for each golfer and their respective positions on the hole according to an example embodiment of the present disclosure; and FIG. 20 is a flowchart of a method for gathering and presenting information associated with a sporting event to a user in a manner tailored to a user's preferences according to an example embodiment of the present disclosure.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Embodiments of the present disclosure relate to the presentation of information on a display, and more particularly, to a method, apparatus, and computer program product to gather and present information associated with a sporting event to a user in a manner tailored to a user's preferences. The viewing of sporting events differs across different types of sporting events. For example, sports centered on a court or a field, such as basketball or football, provide a spectacle within a concise area that is generally entirely visible to stationary spectators. Further, sporting events such as basketball, football, soccer, or the like, use a single ball around which action on the field generally focuses. These types of sports are relatively easy to follow and, because there are only two opposing teams playing at a given time, the score is easily tracked and followed by spectators.

Other sporting events may not be as easily viewed by spectators. Sporting events with more than two competing players and sporting events that are not bound by a field or court may be more difficult for a spectator to follow. Golf is one such example where numerous players play on a single course spread out over thousands of yards. Further, golfers are not all competing at the same time on the same hole, such that tracking golfers during a golfing event can be difficult. In-person viewing of golf limits the viewing ability of a spectator as they can follow a small subset of golfers around a course, or view a wider array of golfers for only a portion of the course, but cannot see all golfers along the entire course. Television has provided an improved golf viewing experience whereby television crews can capture video footage of golfers at different locations on the course. Television broadcasts can weave together video footage from around a golf course in some temporal sequence that provides a viewing experience for a spectator watching the broadcast that is not feasible for a spectator watching the sport in-person.

Given the improvements in video capture technology and the number of cameras capturing video around a golf course for a professional event, the television viewing experience is highly engaging and informative. While in-person spectating may not provide all of the viewing experiences available through television, however, many will still argue that in-person spectating of sporting events is a unique experience that is difficult to rival.

More recently, mobile devices such as smart phones have provided portable video screens through which sporting event spectators may view sporting events. Further, these mobile devices can be used to supplement other viewing experiences, such as to supplement a television broadcast or to supplement an in-person spectating experience. Example embodiments of the present disclosure provide a graphical user interface that may be employed in mobile devices or in televisions, computer monitors, tablet computers, etc. to provide an enhanced viewing experience for sporting events.

Embodiments of the present disclosure provide a graphical user interface that enables a user to customize their viewing of a sporting event. While example embodiments may be suitable for a variety of sporting events, embodiments are particularly well-suited to tracking the play of golfers during a golfing event or tournament. Thus, while embodiments of the present disclosure may be implemented for a variety of sporting events, embodiments are described generally herein with respect to golf. According to the embodiments described, a subject includes a golfer while an athletic event of the subject includes a golf shot. A golf shot, as described herein, includes a golf ball being struck by a golf club swung by a golfer, and traveling a distance to a location ending the golf shot.

According to an example embodiment described herein, image capture devices are used to capture video of a plurality of golf shots from a plurality of players at a golfing event. The location of each golf shot for each golfer is tracked for position and scoring status, with shots after the tee-shot reflecting the location of a player's ball from the prior shot. The round number, stroke number, shot distance, and score for each golfer is tracked and updated in real-time or near real-time during the golf event. Video from the image capture devices may be captured for each golf shot for each golfer. The video may be edited to form a highlight of each golf shot and may be associated with the respective golf shot for each golfer. The video is associated with the player, the hole, and the position relative to the hole and is stored in a database with the associated tags to define the context of the video segment. The golfer of a video segment may be identified as the subject of the video segment, while the hole number, position relative to the hole, stroke number, course name, etc. are contexts of the respective video segment. Once video segments are tagged with their subject and context, the video segments may be stored in a database (e.g., in a memory device) and made available for viewing, as will be described further below.

Beyond video segments of athletic events such as golf shots, embodiments provided herein include a graphical user interface for tracking a location of a golfer and golf shots along holes of the course. Embodiments provide a map, which may include a two-dimensional or three-dimensional map of the course on which an event is being played. The ball position before and after each golf shot may be identified and recorded so that it can be accurately identified on the map.

The graphical user interface presented on a display of a device may present the map of the course whereby each hole of a course may be individually selectable. Upon selection of a particular hole, the display may zoom in to focus on the selected hole rather than the entire course. The map may be of sufficient detail that the terrain and course obstacles can be presented in a detail view depicting the position of a ball along a hole.

The position of each golf shot and the ball may be identified on the map through geo-referencing, where a ball location may be surveyed with a survey laser after it has come to rest following a shot. This surveyed location may be identified by a global coordinate position (e.g., latitude and longitude) and used by embodiments described herein to identify the location of a shot on the map of the course. The golf ball location may be tracked through various available techniques, such as using ball tracking software and devices used in the golf industry. The flight or path of a golf shot may be traced either through identification of a number of points of the trajectory or through a simulation. The path of a golf shot taken may be presented to a user on the user interface as identified by flight-tracking software, where the angle of departure may be established, and the arc of the shot may be estimated. The path of the golf shot taken may be provided for display on a map of the hole to illustrate to a user the flight path of the ball and to convey the path of the shot to the resting place of the ball following the shot.

The above-described video segments and course/hole map including ball and golf shot locations may be combined to provide a graphical user interface through which a user can interact with and observe the golf event in a level of detail not previously available. A user may select a golfer (i.e., a subject) and a hole of the course. The graphical user interface may then present the position of each shot on the selected hole of the course for the selected golfer. Optionally, the graphical user interface may present a map of the course from which a user may select a hole. The user may have previously selected a golfer or may select a golfer after selection of the hole. The shot locations for the selected golfer may be presented on the map of the hole on the display providing the graphical user interface. A user may zoom in on a portion of a hole to focus on an individual shot, where the initial position displayed upon selecting a golfer and a hole may be the tee box area for that hole.

The graphical user interface of example embodiments may include a timeline that presents the golf shots along the timeline from the tee shot until the final shot resulting in the ball entering the cup for a hole. This timeline may provide indicators along the timeline for each shot taken. The indicators may be in the form of a numerical indicator along the timeline for the shot number, for example. The location of the numerical indicators along the timeline may be equally spaced, or they may be spaced proportionally (or logarithmically) to the distance hit for each shot. For example, if a first shot traveled 300 yards of a 400-yard hole, the second shot location may be identified at 75% along the timeline reflecting that the first shot traveled 75% of the distance to the hole. As strict proportionality may result in a "bunching" of shots within 5-10 yards of a hole (e.g., two putts or chip-and-putt), the timeline may present a logarithmic timeline, where there is some degree of proportionality while shots closer to the hole can remain spaced out on the timeline.

Each shot indicator positioned along a timeline may be a user interface element of the graphic user interface that is selectable by a user. For example, a user may select a shot along the timeline and the display may present a position of the shot on a virtual representation of the hole (e.g., the map described above). Further, as video segments have been captured of each shot, the video segment corresponding to the selected shot may be shown upon selection of the associated user interface element. The video segment may be displayed in a picture-in-picture format for certain display devices, such as devices with relatively larger screens (e.g., tablet computers or desktop computer monitors), where the video segment may be presented in a larger format, up to full-screen, for relatively smaller screen devices, such as smart phones. Further, the format presented may be user configurable as even on a large-format screen viewers may wish to see a video segment in full-screen display.

The captured video, video segment generation, and location tracking of each shot may be performed through a network of entities, where video segment generation may be facilitated by artificial intelligence and machine learning to extract the most relevant portions of the captured video of a shot. Assimilating the video segments with the location tracking and shot tracking may provide a mechanism by which a user of the graphical user interface can obtain up-to-date scoring, location, and video of shots for each golfer in a matter of minutes or even seconds. The video segment, location, and path of a tee shot may be available to a user before the hole has even been completed by the respective golfer.

Figure 1:
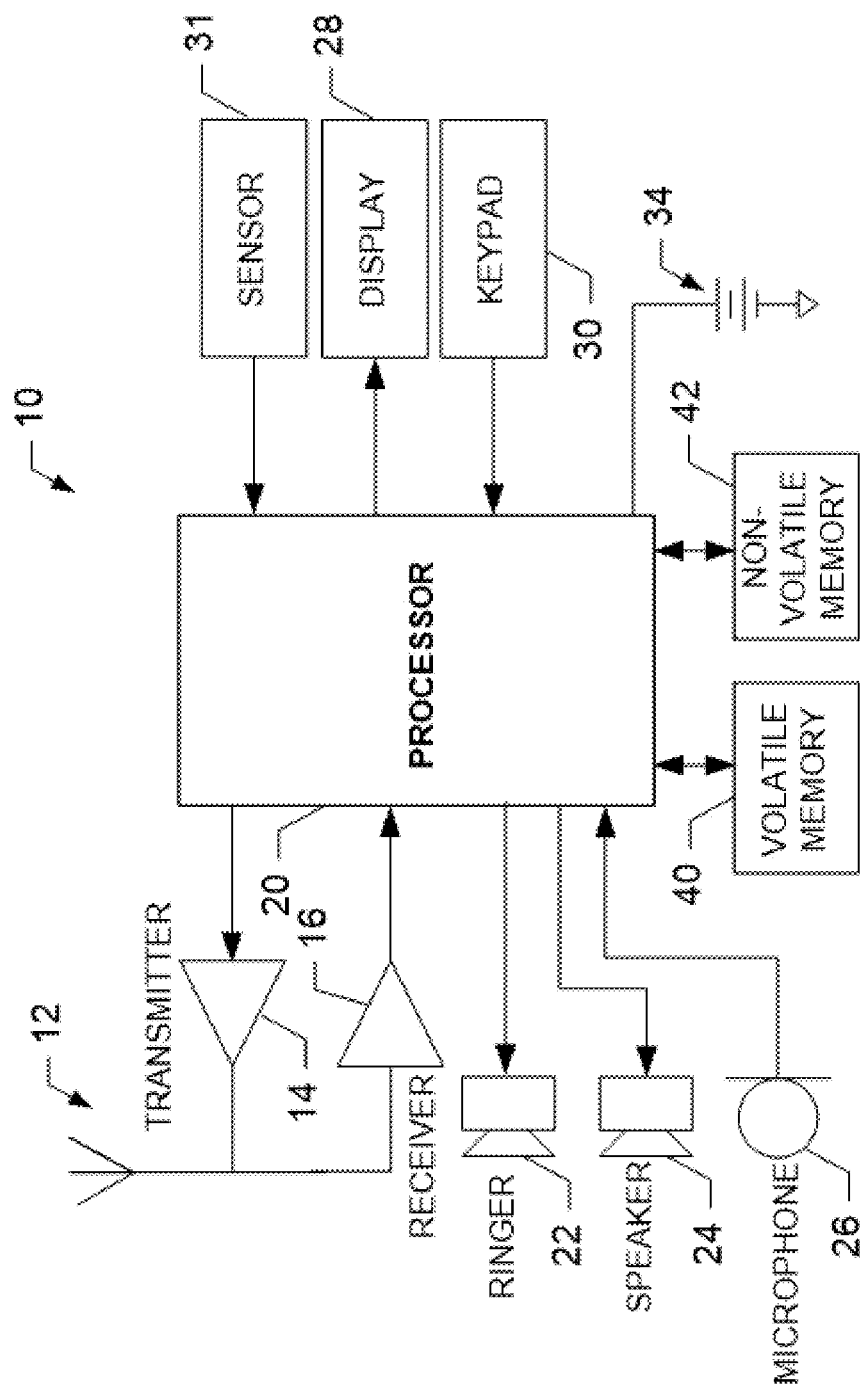
FIG. 1 is a schematic block diagram of a mobile device according to an example embodiment of the present disclosure.

Embodiments described herein provide for presentation of information on a display, and more particularly, provide a method, apparatus, and computer program product to gather and present information associated with a sporting event to a user in a manner tailored to a user's preferences. While embodiments may be implemented on various devices and types of devices, one example embodiment of such a device is illustrated in FIG. 1, which depicts a mobile device 10 that may benefit from embodiments of the present disclosure. It should be understood, however, that the mobile device 10 as illustrated and hereinafter described is merely illustrative of one type of device that may benefit from embodiments of the present invention and, therefore, should not be taken to limit the scope of embodiments of the present invention. As such, although numerous types of mobile devices, such as portable digital assistants (PDAs), mobile telephones (smart phones), gaming devices, laptop computers, tablet computers, touch surfaces, audio/video players, or any combination of the aforementioned, and other types of video display systems, may readily employ embodiments of the present invention, other devices including fixed (non-mobile) electronic devices such as televisions and computer monitors may also employ some example embodiments.

The mobile device 10 may include an antenna 12 (or multiple antennas) in operable communication with a transmitter 14 and a receiver 16. The mobile device 10 may further include an apparatus, such as a processor 20 or other processing device (e.g., processor 70 of FIG. 2), which controls the provision of signals to and the receipt of signals from the transmitter 14 and receiver 16, respectively. In this regard, the mobile device 10 is capable of operating with one or more air interface standards, communication protocols, modulation types, and access types. By way of illustration, the mobile device 10 is capable of operating in accordance with any of a number of first, second, third, fourth, and/or fifth-generation communication protocols or the like. For example, the mobile device 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A)), fifth-generation (5G) or the like. As an alternative (or additionally), the mobile device 10 may be capable of operating in accordance with non-cellular communication mechanisms. For example, the mobile device 10 may be capable of communication in a wireless local area network (WLAN) or other communication networks.

In some embodiments, the processor 20 may include circuitry desirable for implementing audio and logic functions of the mobile device 10. For example, the processor 20 may be comprised of a digital signal processor device, a microprocessor device, and various analog to digital converters, digital to analog converters, and other support circuits. Control and signal processing functions of the mobile device 10 are allocated between these devices according to their respective capabilities. The processor 20 thus may also include the functionality to convolutionally encode and interleave message and data prior to modulation and transmission. The processor 20 may additionally include an internal voice coder and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile device 10 to transmit and receive Web content, such as location-based content and/or other web page content, according to a Wireless Application Protocol (WAP), Hypertext Transfer Protocol (HTTP) and/or the like, for example.

The mobile device 10 may also comprise a user interface including an output device such as a conventional earphone or speaker 24, a ringer 22, a microphone 26, a display 28, and a user input interface, all of which are coupled to the processor 20. The user input interface, which allows the mobile device 10 to receive data, may include any of a number of devices allowing the mobile device 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile device 10. Alternatively or additionally, the keypad 30 may include a conventional QWERTY keypad arrangement. The keypad 30 may also include various soft keys with associated functions. In addition, or alternatively, the mobile device 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, heart-rate sensor, thermal sensor, thermal imaging sensor, or the like. Forms of input that may be received by the sensor may include physical motion of the mobile device 10, whether or not the mobile terminal 10 is in a dark environment (e.g., a pocket) or in daylight, whether the mobile terminal is being held by a user or not (e.g., through temperature sensing of a hand or through heart-rate detection). The mobile device 10 further includes a battery 34, such as a vibrating battery pack, for powering various circuits that are required to operate the mobile device 10, as well as optionally providing mechanical vibration as a detectable output.

Figure 2:
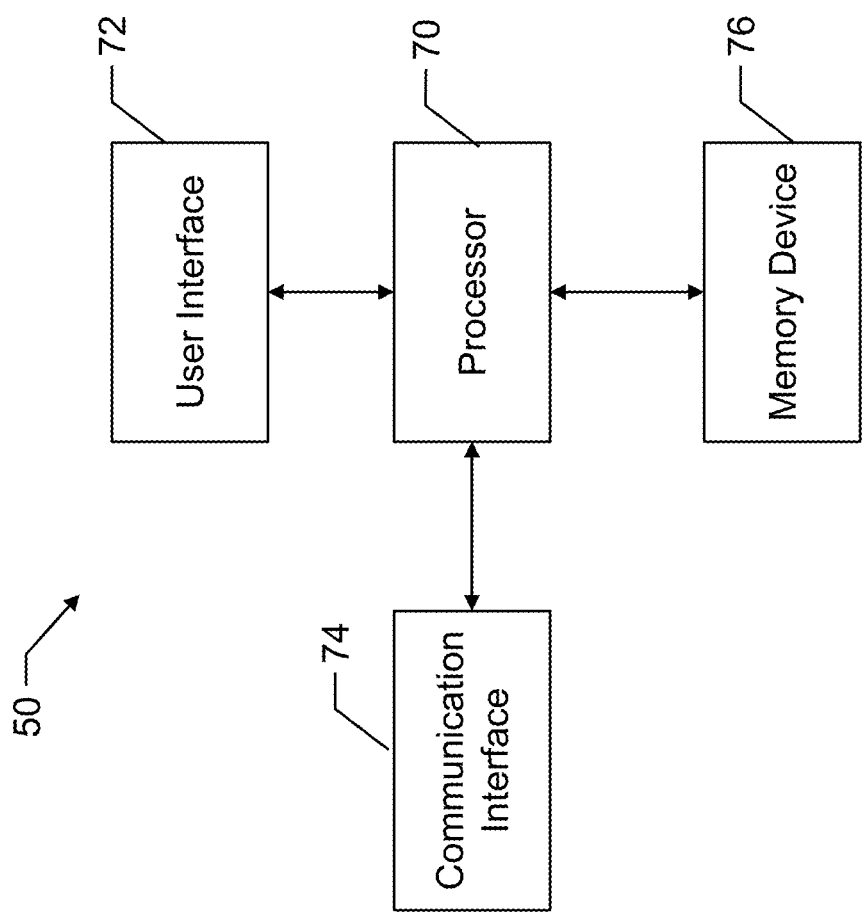
FIG. 2 is a schematic block diagram of an apparatus for gathering and presenting information associated with a sporting event to a user in a manner tailored to a user's preferences according to an example embodiment of the present disclosure.

An example embodiment of the present disclosure will now be described with reference to FIG. 2, which illustrates certain elements of an apparatus 50 for providing presentation of information on a display, and more particularly, a method, apparatus, and computer program product to gather and present information associated with a sporting event to a user in a manner tailored to a user's preferences. The apparatus 50 of FIG. 2 may be embodied by or otherwise associated with a device such as mobile device 10 of FIG. 1.

The apparatus 50 may, in some embodiments, be embodied by or otherwise associated with a mobile device (e.g., mobile device 10) as illustrated in FIG. 1 or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, which may be combined with the user interface 72 as a touch screen display. In different example cases, the user interface 72 may include a two-dimensional (2D) or three-dimensional (3D) display. In an example embodiment with a touch screen display, the touch screen display may be embodied as any known touch screen display. Thus, for example, the touch screen display could be configured to enable touch recognition by any suitable technique, such as resistive, capacitive, infrared, strain gauge, surface wave, optical imaging, dispersive signal technology, acoustic pulse recognition, etc. techniques. As such, the user interface 72 may be in communication with the touch screen display to receive indications of user inputs at the touch screen display and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

Figure 3:
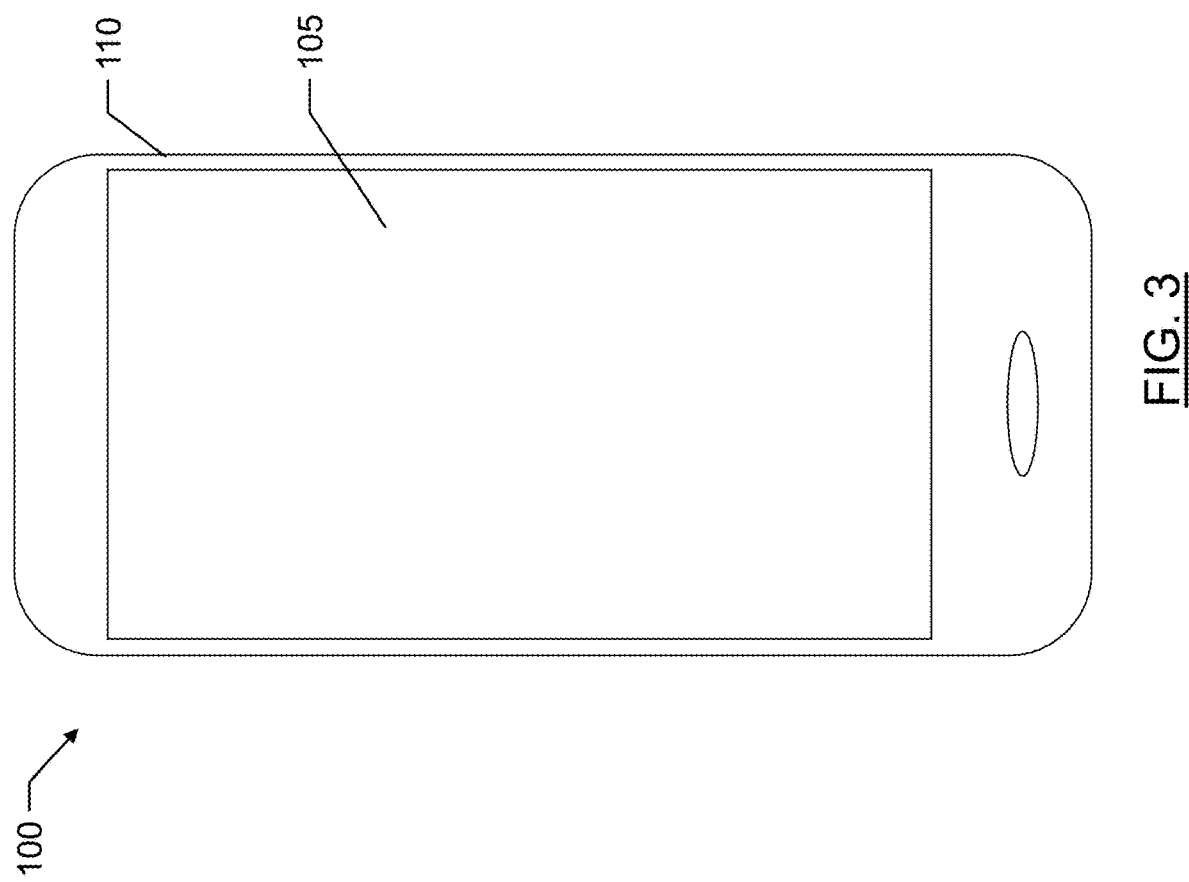
FIG. 3 illustrates a device for providing a mechanism by which information associated with a sporting event may be presented to a user in a manner tailored to a user's preferences according to an example embodiment of the present disclosure.

FIG. 3 illustrates a device 100 for providing a mechanism by which information associated with a sporting event may be presented to a user in a manner tailored to a user's preferences. The device of the illustrated embodiment may include a device housing 110 and a display 105. The display may embody, in part, the user interface 72 and may be a touch-screen display configured to receive input from a user through a graphical user interface.

Figure 4:
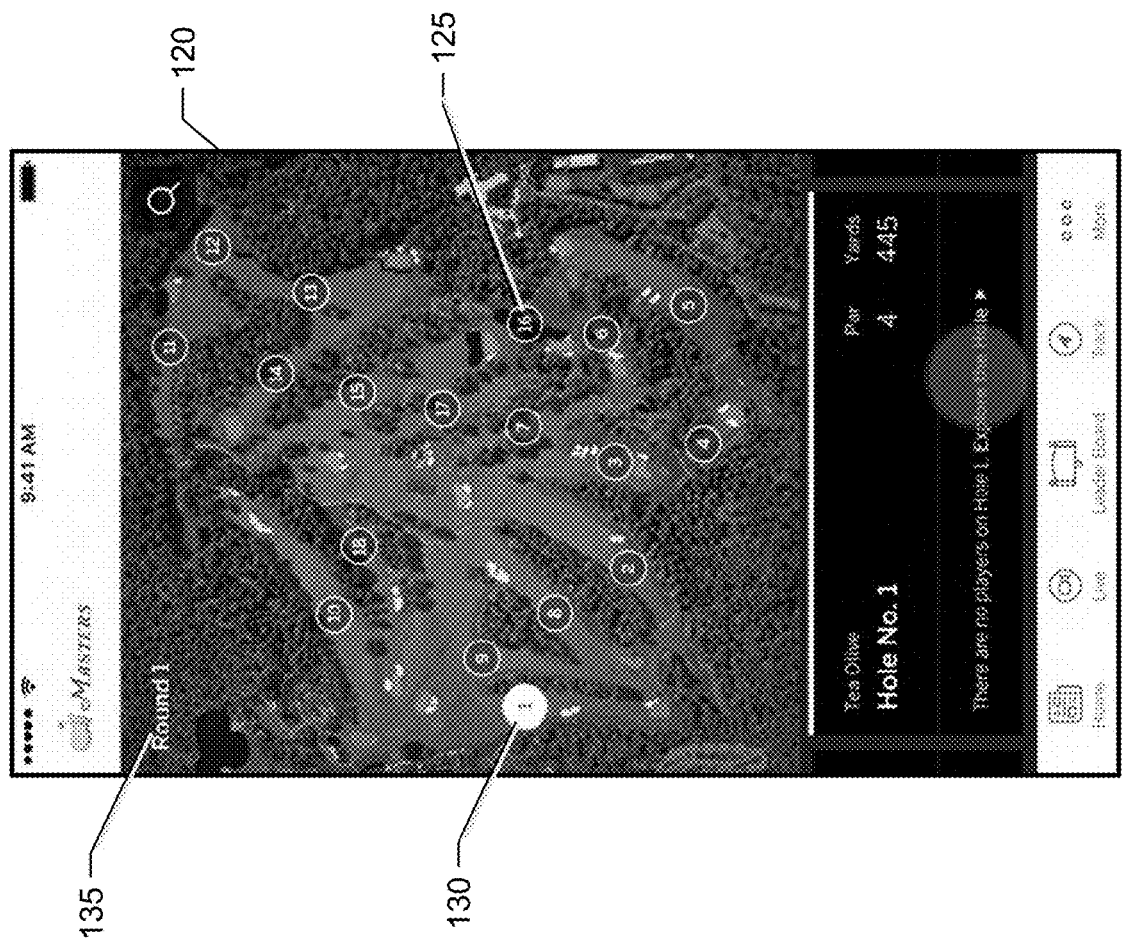
FIG. 4 illustrates a course map according to an example embodiment of the present disclosure.

User interaction with the graphical user interface will herein be described with respect to various features of the graphical user interface. According to an example embodiment of the present disclosure, a course map 120 may be provided for display as shown in FIG. 4, where a plurality of holes is depicted on the map with icons such as icons 125 and 130. A hole of the course may be selected by a user selection of an icon, such as by tapping on an icon on the course map 120 to select the hole corresponding to the icon. In the illustrated embodiment, icon 130 for Hole 1 is shown as selected in response to user input. Optionally, Hole 1 may be the default hole selection when a user does not select a hole. Selection of a hole during a golf event may identify the golfers currently playing on the selected hole. The names of the golfers may be shown at a bottom of the course map 120, for example.

When no players are on the hole, such as before or after an event, or during an event, a message may indicate no players on the hole and/or details of the selected hole may be provided for display. Optionally, if a hole is selected after at least some players have played the hole, or after a round has been completed, selection of the hole may result in presentation of a user input element that can be selected by the user to display highlights of the selected hole. Highlights may include video segments of players that have already played the hole, where highlights include a hierarchical ordering of shots that satisfy at least one predefined criteria. For example, predefined criteria may include a drive of at least a certain distance (e.g., top 10% in distance for the hole), a putt of a certain length (e.g., above a threshold length or in the top 10% of longest putts made on the hole), a crowd noise measure indicating an exciting golf shot (e.g., crowd noise in the top 20% of crowd noise for the hole), or other criteria that indicate a golf shot was extraordinary. These highlights may be selected automatically from the video segments, such as through artificial intelligence or machine learning, or by contextual analysis of the video segment (e.g., a putt made at two under par for a hole).

The display of FIG. 4 also indicates a round number with a round identifier 135 on the display. When more than one round has been played, this indicator may be a user interface element that enables a user to select the round number in which they are interested. Selection of a particular round number may limit the highlights to video segments of that particular round. An option may be available for all rounds, where highlights include video segments from all rounds that have been played.

Figure 5:
FIG. 5 illustrates a hole detail view depicting a zoomed out view of the selected hole according to an example embodiment of the present disclosure.

When a hole is selected, as depicted in the course map 120 of FIG. 4 in lieu of or in addition to indicating any golfers playing on the hole or having played the hole, a "hole detail view" user interface element may be available for selection by a user. FIG. 5 illustrates such a hole detail view 140 illustrating a zoomed out view of the selected hole. A user may zoom, pan, rotate, and tilt the view within the parameters of the hole to view the hole from any available angle. The zoom, pan, rotate, and tilt instructions may be generated, for example, by movement and orientation of a mobile device (e.g., mobile device 10 of FIG. 1), and/or through user input received on a display or other user interface of the device. After any movement of the viewpoint, an icon may be presented that can be selected by a user to return to the original view and orientation of the hole detail view.

Figure 6:
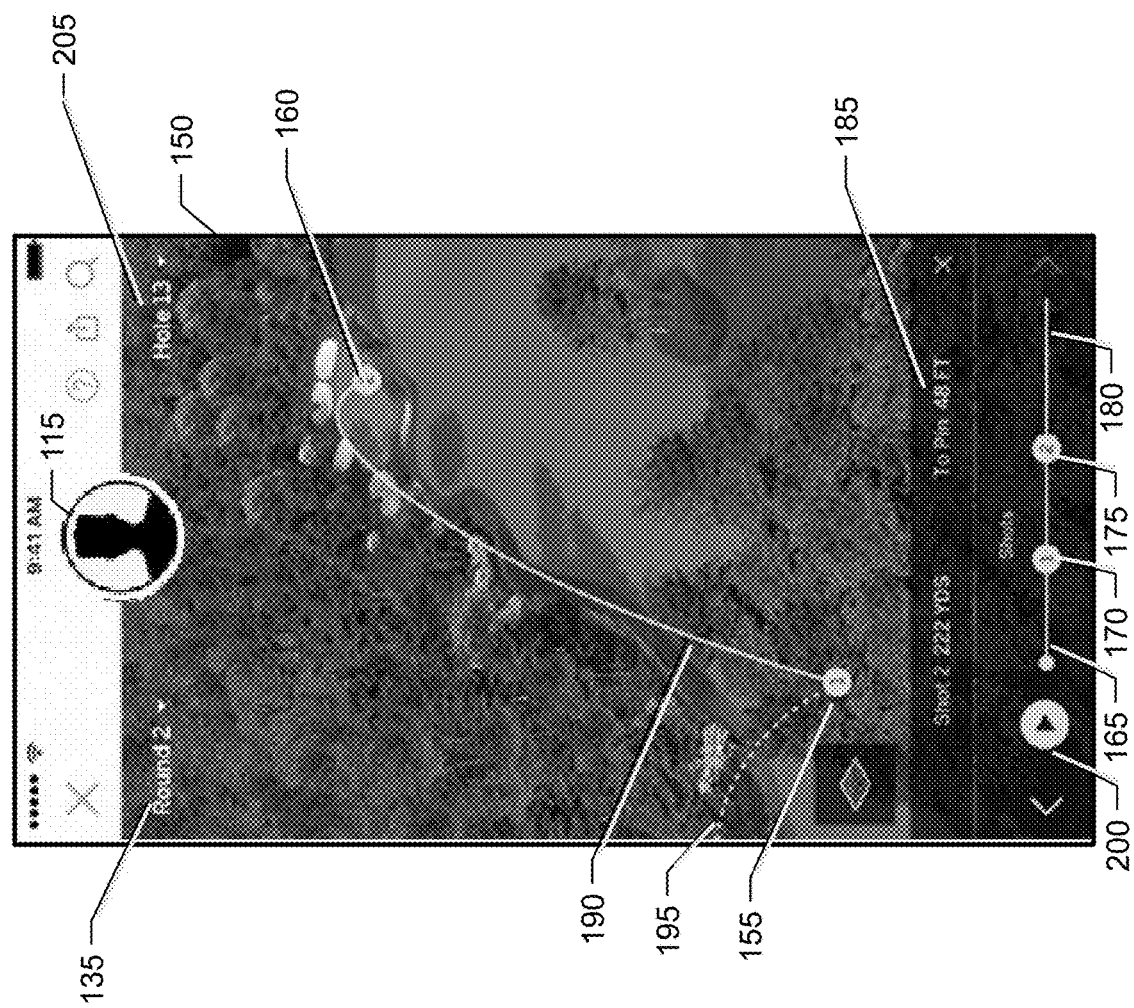
FIG. 6 illustrates a track detail view user interface according to an example embodiment of the present disclosure.

During a golf event with players actively playing on holes of the course, the user interface may provide different options for viewing of the event. A user may track one or more player's gameplay in near real-time. A track detail user interface provides detailed information on a player's latest shot and may include a shot path on a map and corresponding data displayed above a timeline. FIG. 6 illustrates an example embodiment of a track detail user interface 150. As shown, the view is elevated above a hole and depicts a starting point for a golf shot for a selected player. The selected player is indicated with the selected player icon 115, which may be a profile picture, name, logo, or other identifier. In the illustrated embodiment, the shot is the second stroke, beginning at the location where the ball landed after the first stroke, indicated by the "1" highlighted at spot 155 on the map of the track detail user interface 150. A second location indicated by the "2" highlighted at spot 160 on the map shows the location where the second shot stopped.

A timeline 165 is illustrated at the bottom of the track detail view user interface 150 with indicators for the first shot 170 and second shot 175, while a remaining portion of the timeline 180 remains a different color than the portion of the timeline completed, indicating that there are still shots remaining on the hole. A distance to pin 185 is indicated in the view. Also shown in the track detail view user interface 150 is the trajectory of the second shot 190 in a solid line, distinguished from a trajectory of the first shot 195 in a broken line. Some of the features depicted in FIG. 6 may not be present in some views.

Also shown in FIG. 6 is a "play" button 200. This button may provide an animated view of the progress on the selected hole. Pressing the play button 200 may animate a first shot on the track detail view user interface 150 showing a trajectory of the ball of the first shot from a starting location (e.g., tee box) to where the first shot stopped at spot 155. The animation may continue to show an animation of the second shot showing the trajectory 190 of the ball of the second shot from the starting location at spot 155 to where the second shot stopped at spot 160. This may continue through all completed shots. If a hole has been completed by a player, the animation may begin with a tee-shot and end with the shot finishing at the cup of the hole. The track detail view user interface 150 may further include a hole identifier 205, whereby a user can select a hole they wish to view, similar to the round identifier 135.

Figure 7:
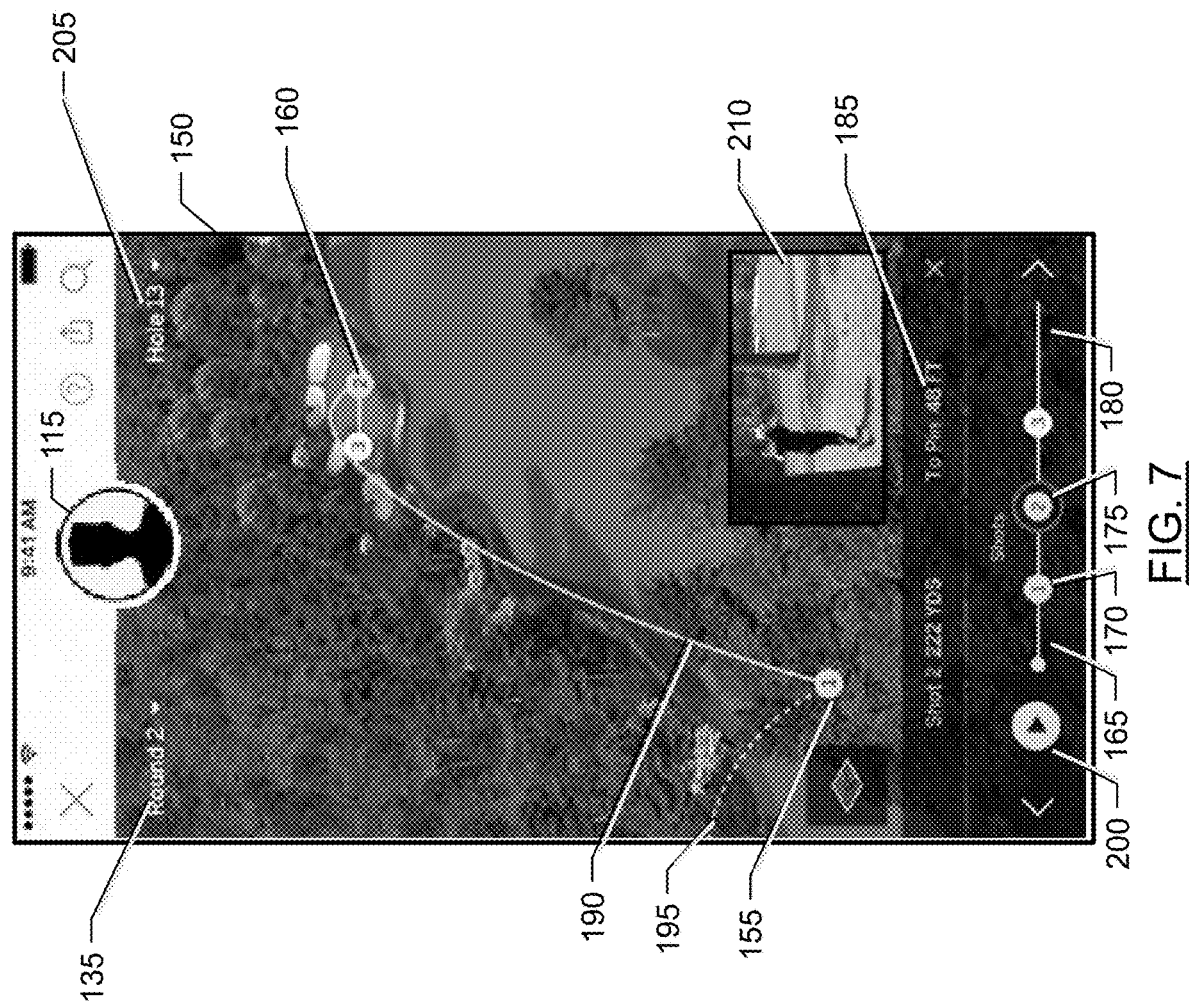
FIG. 7 illustrates another embodiment of the track detail view user interface according to an example embodiment of the present disclosure.

FIG. 7 illustrates another embodiment of a track detail view user interface 150. As shown, when a new golf shot becomes available (e.g., when a shot has been recorded in a video segment and stored in a database), an indication may be provided on the user interface. In the illustrated embodiment, a circle surrounds the indicator for the second shot 175 to highlight the indicator indicating a third shot has occurred. Optionally, an indicator may be present only for shots not previously viewed by the user, such that the indicators provide an identifier of new shots available for viewing. Selection of the highlighted indicator may retrieve the video segment of the golfer completing the golf shot. In the illustrated embodiment of FIG. 7, the video segment is displayed in picture-in-picture view with a video frame 210 appearing over a portion of the map view. Optionally, a highlight indicating a new golf shot video is available may appear in a different highlight in response to the golf shot satisfying at least one predefined criteria, such as those mentioned above in describing highlight video criteria. For example, if a golf shot is exceptional as defined by various metrics described below, the indicator of an available video of the shot may be presented with a different visual effect, such as shape, size, color, movement, etc. A user may opt to view the video segment in a larger view, such as a full-screen view. The user may select the video frame 210, which may enlarge the frame or offer options such as "full-screen" or to close the video frame.

Figure 8:
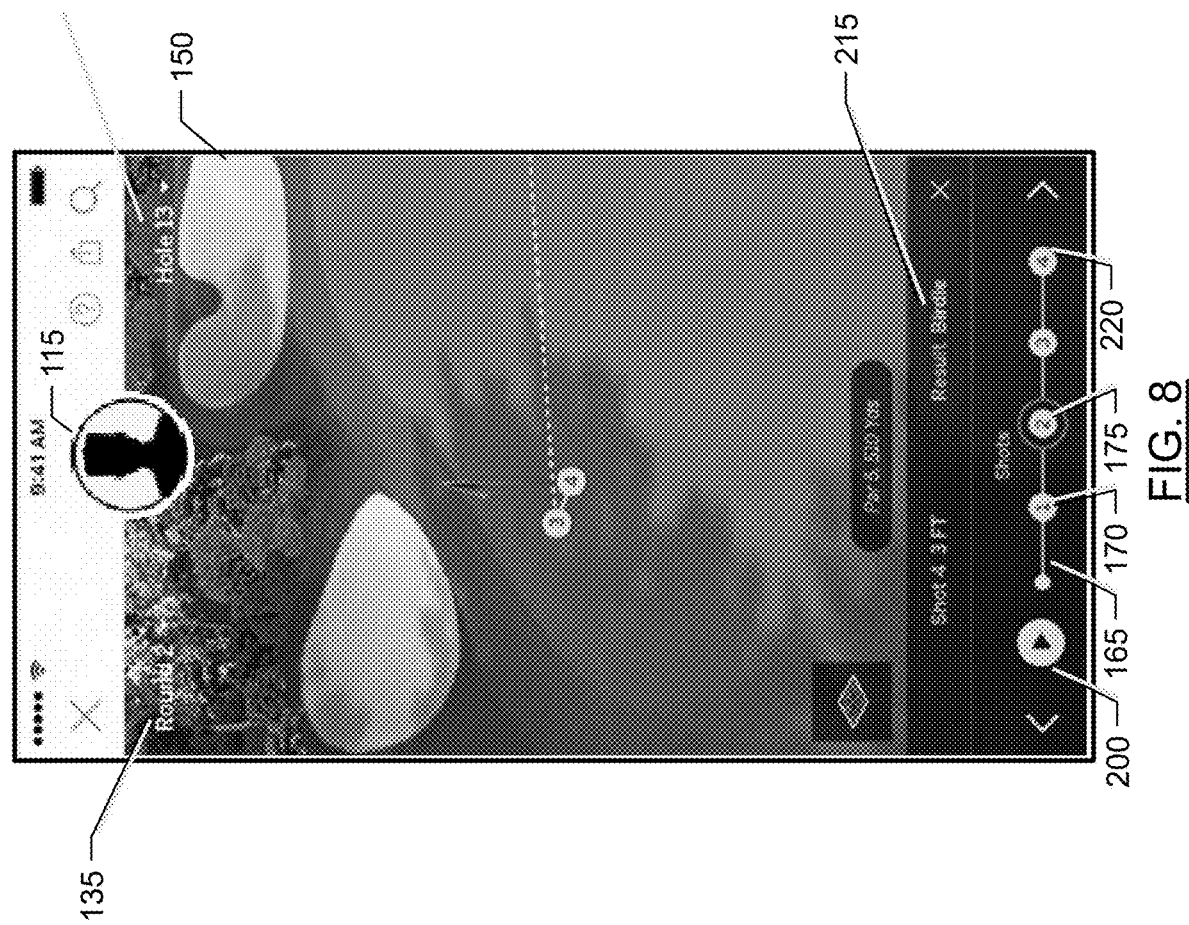
FIG. 8 illustrates an indication of a player's performance on a hole according to an example embodiment of the present disclosure.
Figure 9:
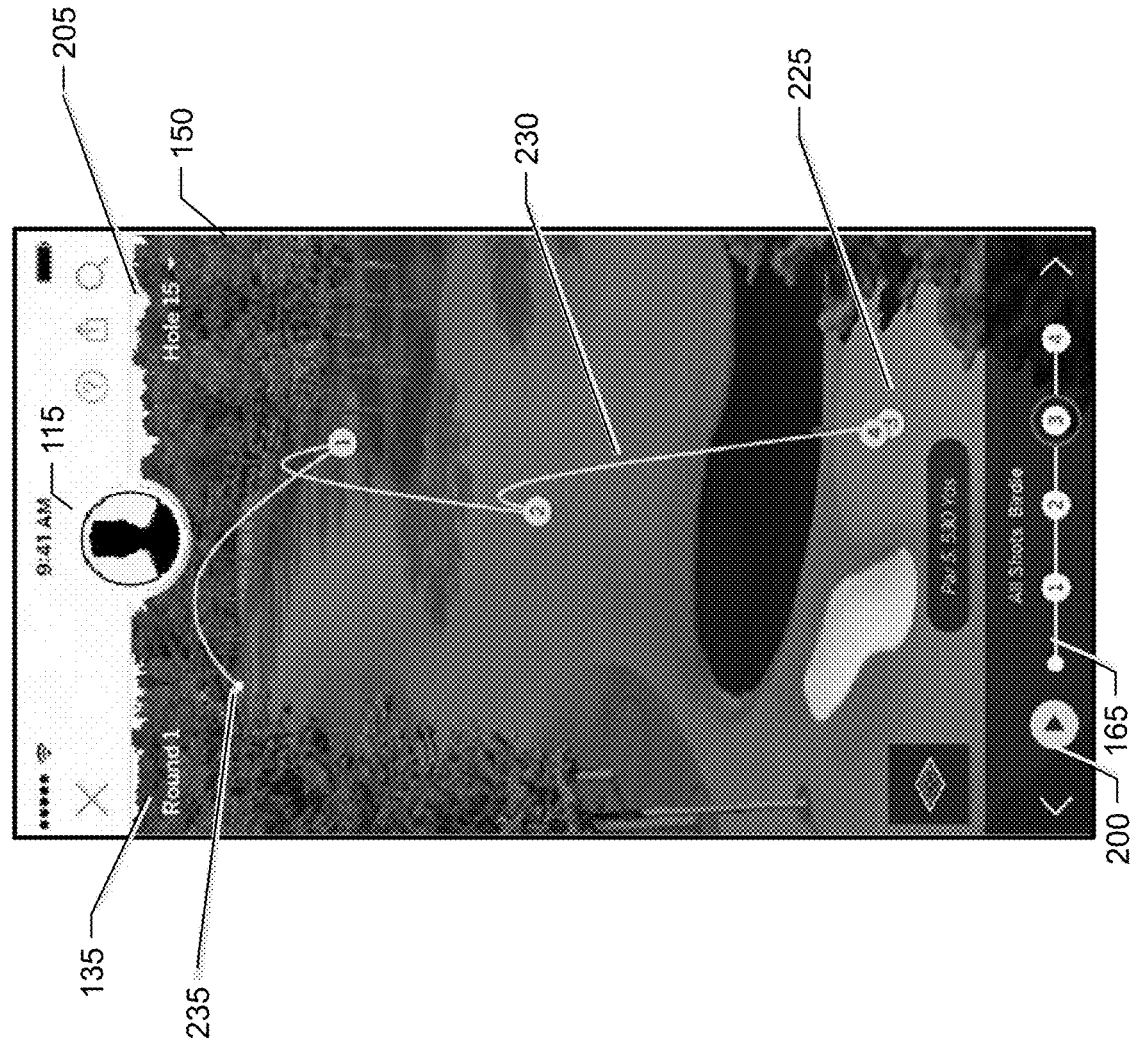
FIG. 9 illustrates a visual summary of shots taken on a hole according to an example embodiment of the present disclosure.

After a player sinks their final shot into the cup of the hole, an indication of the player's performance on the hole may be shown, such as the "birdie" 215 shown in FIG. 8. At this point, the timeline 165 is completed such that the last shot 220 is depicted at the end of the timeline. After a predetermined amount of time from a player's completion of a hole, or upon instruction from a user, such as via a user interface element, the track detail view user interface 150 may show a visual summary of the shots taken on the hole as illustrated in FIG. 9. As shown, the view is from above the green 225 and the hole and shows the inferred trajectories of the shots taken on the hole, such as the trajectory of the third shot 230 that landed on the green. The origin of the shots is the tee shot taken from the tee box 235.

Figure 10:
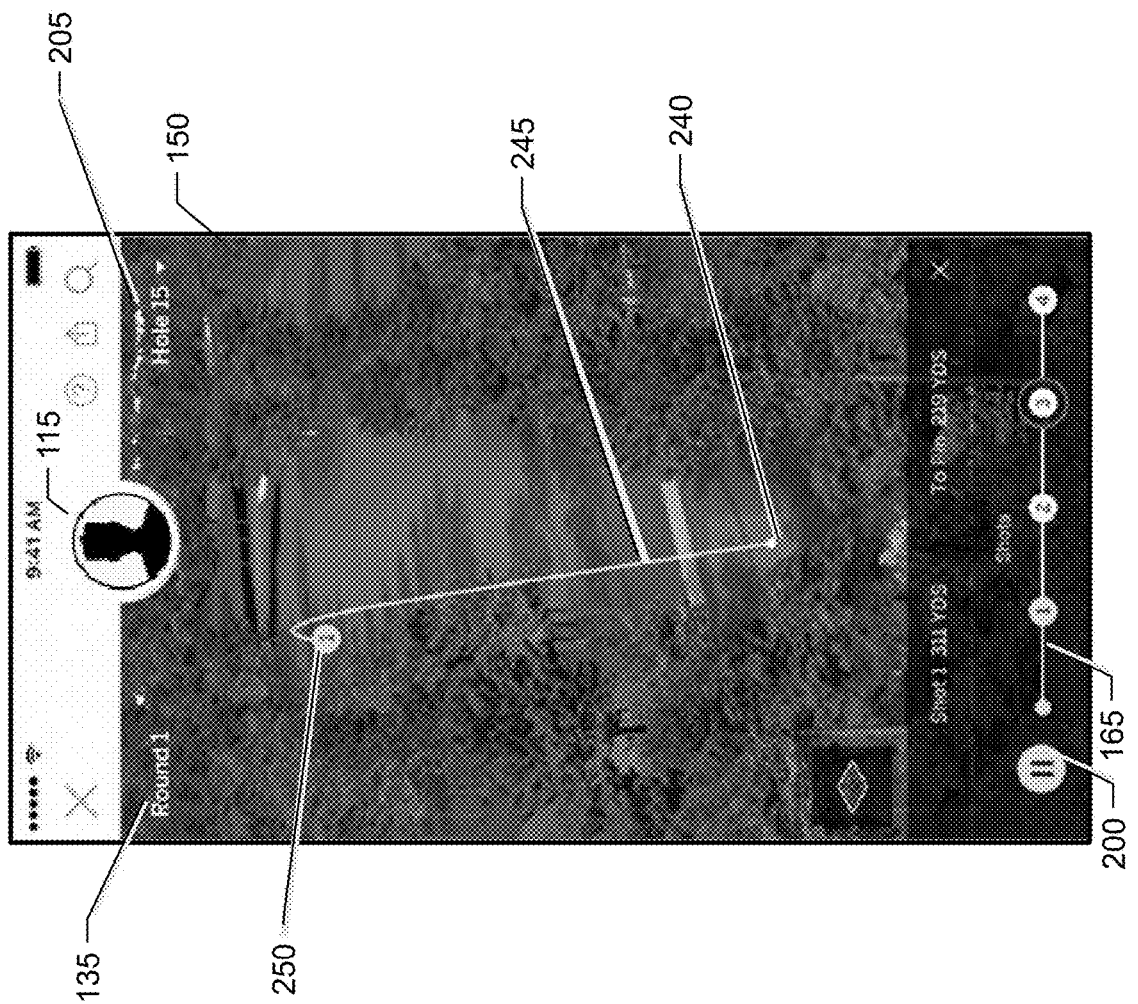
FIG. 10 depicts an animation of a trajectory of a golf shot according to an example embodiment of the present disclosure.

A user may wish to view the shots taken by a player on a hole in sequence. Accordingly, a user may select the play button 200 to begin an animation of the shots taken by the selected player shown in the selected player icon 155 on the hole identified by hole identifier 205 in a round identified by round identifier 135. This animation may be viewed from any perspective chosen by the user, with a default view being an aerial view from behind the location of the shot. FIG. 10 illustrates an example embodiment of this animation. When the play button 200 is selected, the animation begins at the tee box on the tee 240 and animates the trajectory 245 of the first shot to the spot 250 where the first shot stops. This continues with each successive shot on the hole until the hole is completed. The viewpoint may remain at the initial location or may advance along the hole for a closer view of each shot as the shots progress. As the animation plays, the timeline follows with a color change between an un-played portion of the timeline (e.g., shown in white) and a played portion of the timeline (e.g., shown in yellow). Each shot taken may be provided for display when the timeline reaches a corresponding shot icon along the timeline. Video segments of each shot may optionally be shown in a picture-in-picture view, such as shown in video frame 210 of FIG. 7, when the timeline reaches a respective shot.

Figure 11:
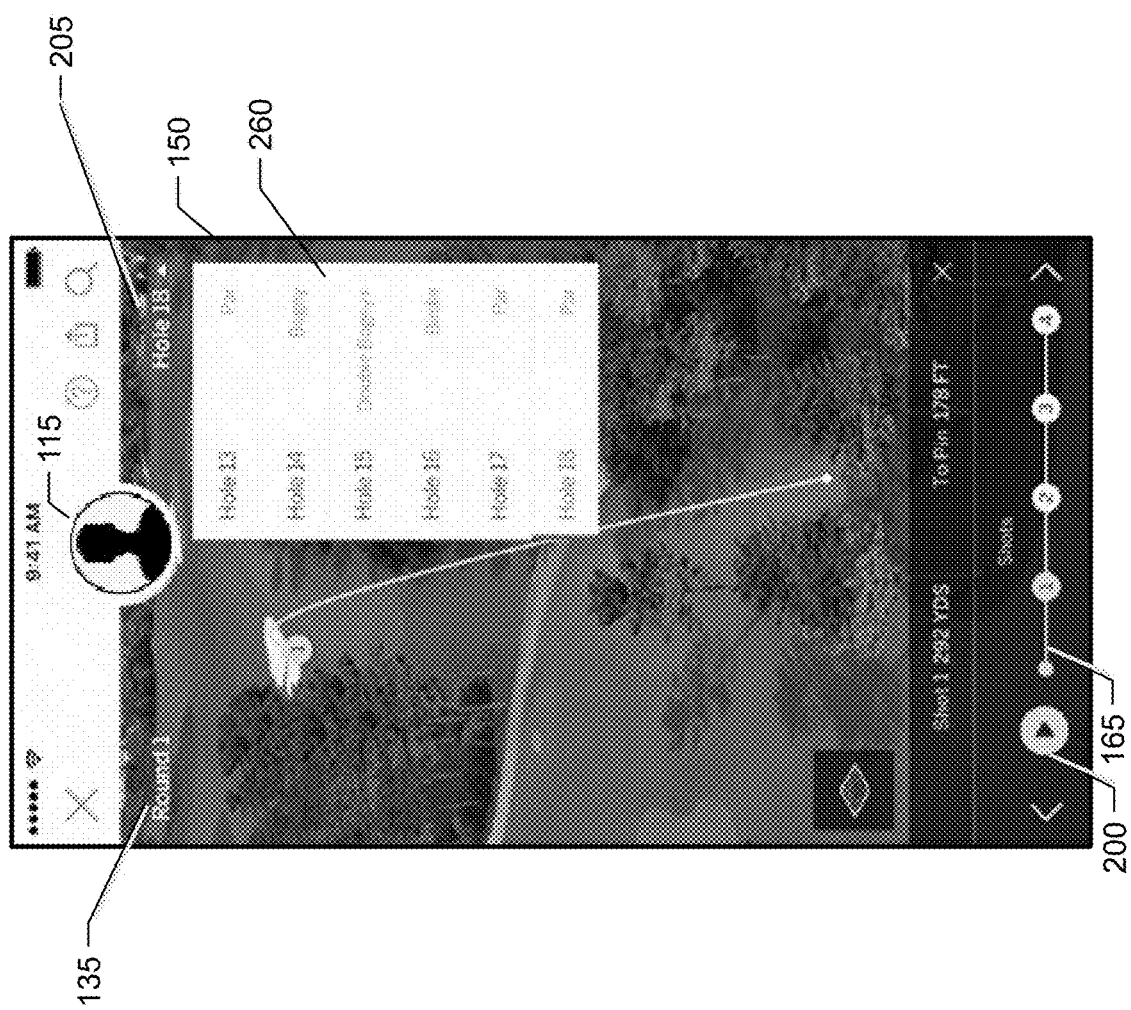
FIG. 11 illustrates the hole identifier selected by a user to show a dropdown menu of holes available for the round according to an example embodiment of the present disclosure.

Each hole played for a selected round (indicated by round identifier 135) may be available for playing in this timeline mode. FIG. 11 illustrates the hole identifier 205 selected by a user to show a dropdown menu 260 of holes available for the round. The dropdown menu may show a limited number of holes but may be scrollable such that a user can see all holes available for the selected round. An indicator of the player's performance on each hole of the dropdown menu 260 may also be shown, such as a Birdie, Eagle, Bogey, Double Bogey, etc. A user may select a hole from the dropdown menu and the hole summary maybe provided for display as shown in FIG. 9.

FIGS. 4 through 11 illustrate a graphical user interface that may be presented on a mobile device 10, such as device 100 of FIG. 3. However, embodiments described herein may be viewed on a plurality of different types of devices and through different interfaces. For example, a user may view the graphical user interface through a web page interface on a computer monitor, a user may view the graphical user interface on a television through an application on a smart TV, a user may view the graphical user interface on a tablet computer, etc.

Golf events may have one hundred or more golfers on a course at the same time, rendering it difficult to see every shot that a user may be interested in viewing, particularly from their preferred or favorite players. Embodiments described herein provide a method of viewing more, if not all, golf shots from a subset of selected players from among all of the players on a course during an event.

While television broadcasts generally show golf shots from across the field of players of an event, the broadcasts are often weighted more heavily to the most famous names in the sport and the players in the lead for the event. Often, lesser known golfers and those that are not leading the field receive less screen time in a television broadcast. While this strategy may please the most viewers, some viewers may wish to see golf shots from their favorite players or from other players of interest. Embodiments described herein provide a graphical user interface referred to herein as "My Group" that enables a user to select a subset of players from a field of players and to view golf shots for the subset of players. The subset of players could include a single golfer or several golfers. Conceivably, there is no limit to the subset beyond the total number of players in the field.

Figure 12:
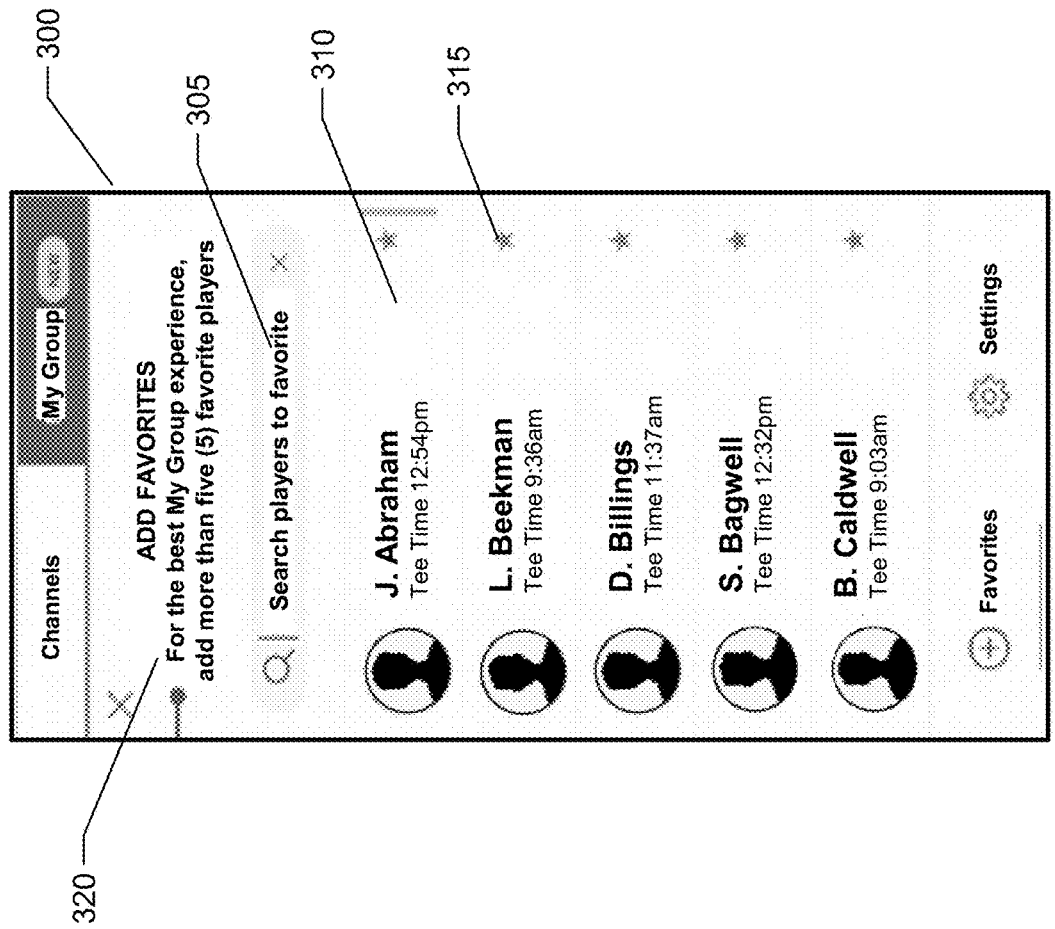
FIG. 12 illustrates an example user interface for selecting a subset of players from the field according to an example embodiment of the present disclosure.

A user may select a subset of players in the field from a menu of players in the field. FIG. 12 illustrates an example user interface 300 for selecting a subset of players from the field. A user may search using a text-entry box 305. Players may be shown in alphabetical order in a list 310, and the list may be refined based on text entered into the text-entry box 305. Once a desired player is visible, a user may select the player, such as by selecting the "star" icon 315 adjacent to that player's entry in the list. If this selection is done during an event, the tee time for each player may be shown with their entry in the list as shown in FIG. 12. The illustrated embodiment further provides a guide statement that the My Group feature of selected players works best with five or more selected players, as will be detailed below. The illustrated embodiment of FIG. 12 may be best suited to smaller screens, such as hand-held devices including smart phones. Larger screens may include icons or pictures of players along with names and other information as there is more room on the display to present such information. As such, the player selection user interface 300 of FIG. 12 is merely illustrative of an example embodiment.

Figure 13:
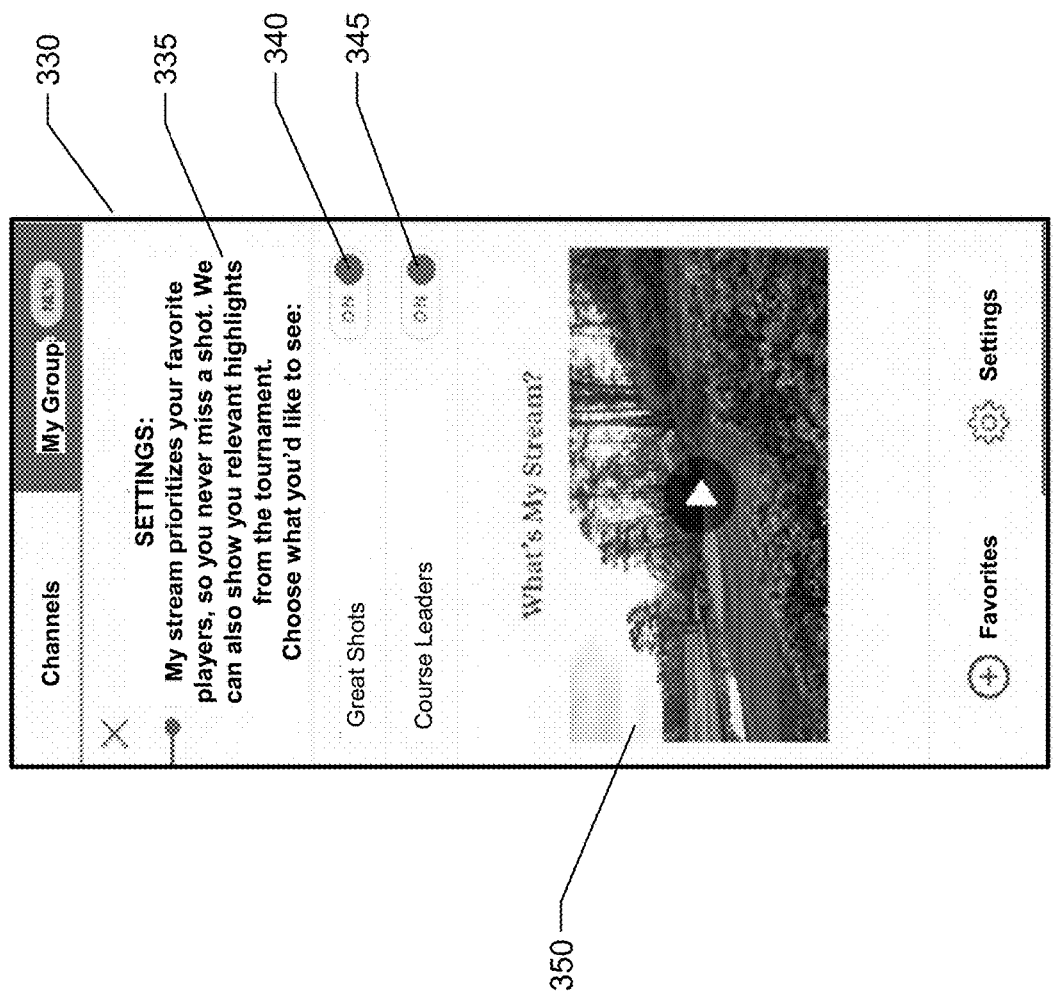
FIG. 13 illustrates a settings screen corresponding to the graphical user interface according to an example embodiment of the present disclosure.

FIG. 13 illustrates a settings screen corresponding to the My Group graphical user interface 330. As shown, the settings screen instructs a user at 335 that the My Group interface prioritizes the selected players, but relevant highlights from the event can also be shown. A first option of "Great Shots" is available for selection at 340 while a second option of "Course Leaders" is available for selection at 345. During an event, the My Group interface will provide information and video segments relevant to the selected players. However, the number of video segments available for the selected players may not be sufficient to result in a continuous stream of video segments from the selected players. Further, as players have staggered start and finish times, a selected player may not be on the course yet or may have finished, such that video segments of golf shots of the player are not being generated. This is also why a selection of five or more players may provide a better streaming experience from the My Group as there will be more content to deliver to a user. When new content is not available to a user, such as when they have caught up on all video segments of the golf shots of their selected players, the user may want other video segments to play while they await new video segments from their selected players. Selecting the "Great Shots" option indicates that the user wishes to see shots that satisfy at least one predetermined criteria when there is no new video segment content from their selected players. Selecting the "Course Leaders" option indicates that the user wishes to see shots that are from players leading the field in scoring.

Video segments qualifying as "Great Shots" satisfy at least one predefined criteria. That criteria includes characteristics of a golf shot that renders the golf shot exceptional. This criteria may include a putt made into a hole from at least a predefined distance (e.g., 20 feet or more), a chip shot made into a hole, a putt for Birdie, a putt for Eagle, a drive of at least a predefined distance, a drive or other shot that lands within a predefined distance of a hole from at least a predefined distance away (e.g., a shot that lands within 10 feet of the hole made from 100 yards or more away), or a shot that causes crowd noise to rise above a predefined volume (e.g., a short putt for par that finishes a player's day as the field leader).

Video segments qualifying as "Course Leaders" may include shots from the players leading the field. The "leaders" may include the top four players, top ten players, etc. Further, the video segments qualifying as "Course Leaders" may also need to satisfy additional criteria. While the criteria may be lower than that of the "Great Shots" criteria, the criteria may be along the same lines.

The settings interface 330 may also include a video tutorial about My Group shown in video window 350. This tutorial video may demonstrate to a user what the Course Leader and Great Shots options entail, along with a tutorial on how My Group works and what its benefits are.

Once a user has selected players and chosen their settings, the My Group interface may be ready for viewing by a user. If a tournament round has not started yet (i.e., there are no active golfers), video segments may be made available to the user of prior rounds of the tournament for their selected players. Optionally, video segments may be made available of highlights of prior rounds. If the tournament has not yet begun, a tournament preview video segment may be played, highlights of previous tournaments, or video segments of shots from prior tournaments for the user's selected players may be played. During an event, video segments corresponding to shots from the user's selected players may be provided for display on the user's device through the graphical user interface.

Figure 14:
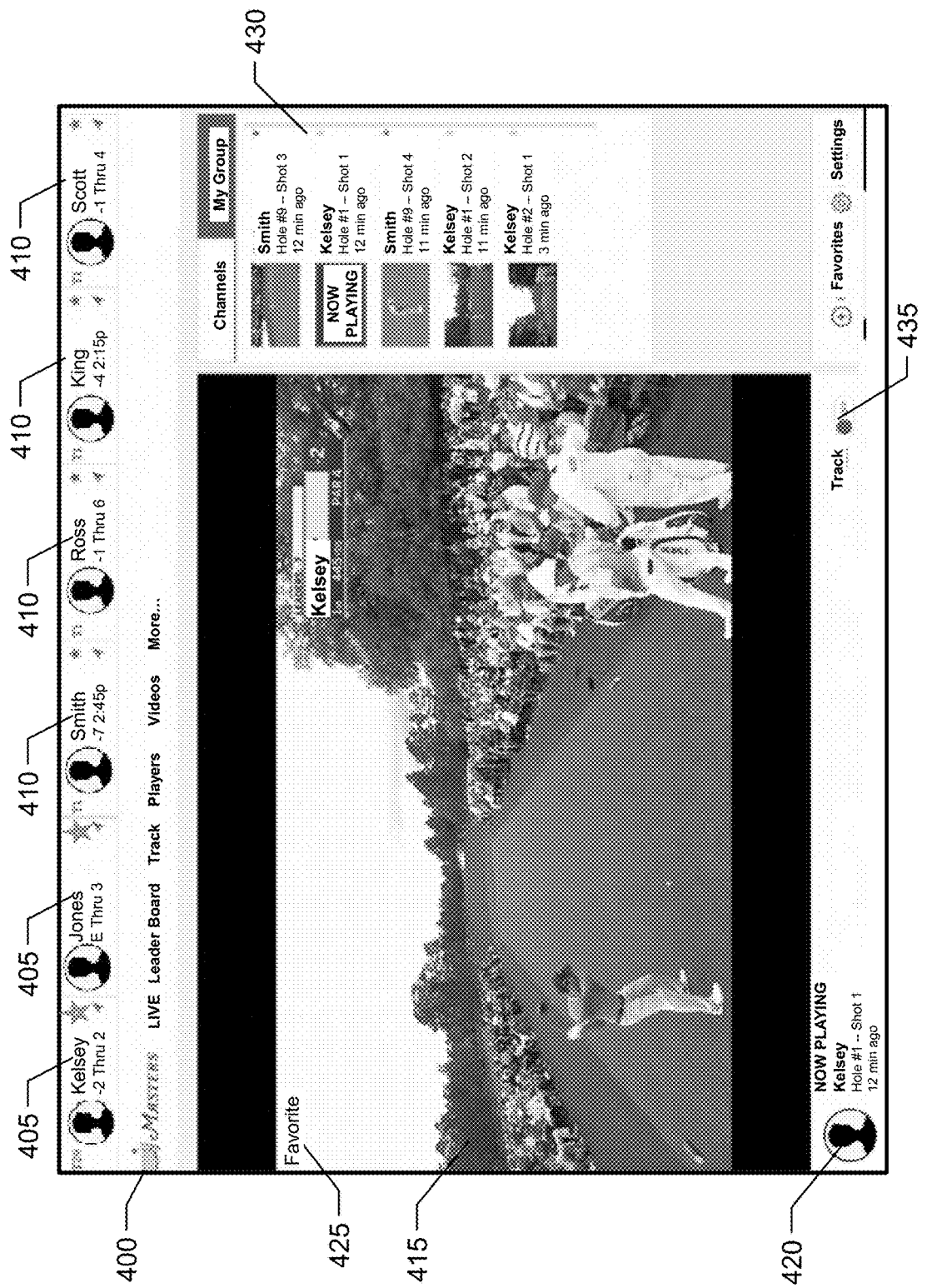
FIG. 14 illustrates a user interface for viewing selected subjects of a sporting event according to an example embodiment of the present disclosure.

FIG. 14 illustrates an example embodiment of a user interface presenting the My Group interface 400. The interface shown may be displayed on a larger format screen, such as a tablet computer; however, embodiments may be implemented on any size screen arranging the elements as appropriate for the screen size and according to a user preference. As illustrated, a number of players are shown across a top of the interface 400. These players include selected players 405 and leaders of the field 410. The display may include a video frame 415 providing display of a video segment of a golf shot. The player in the video segment may be identified as shown at 420. The player or subject of the video segment currently playing is a selected player or a favorite player as indicated by icon 425. A list of upcoming video segments is shown in the list at 430, which may include the "now playing" video segment. The video segment includes a subject, in this case the player, and a context, which can include the event location/course, the event date, the round number, the hole number, the stroke number, etc.

Figure 15:
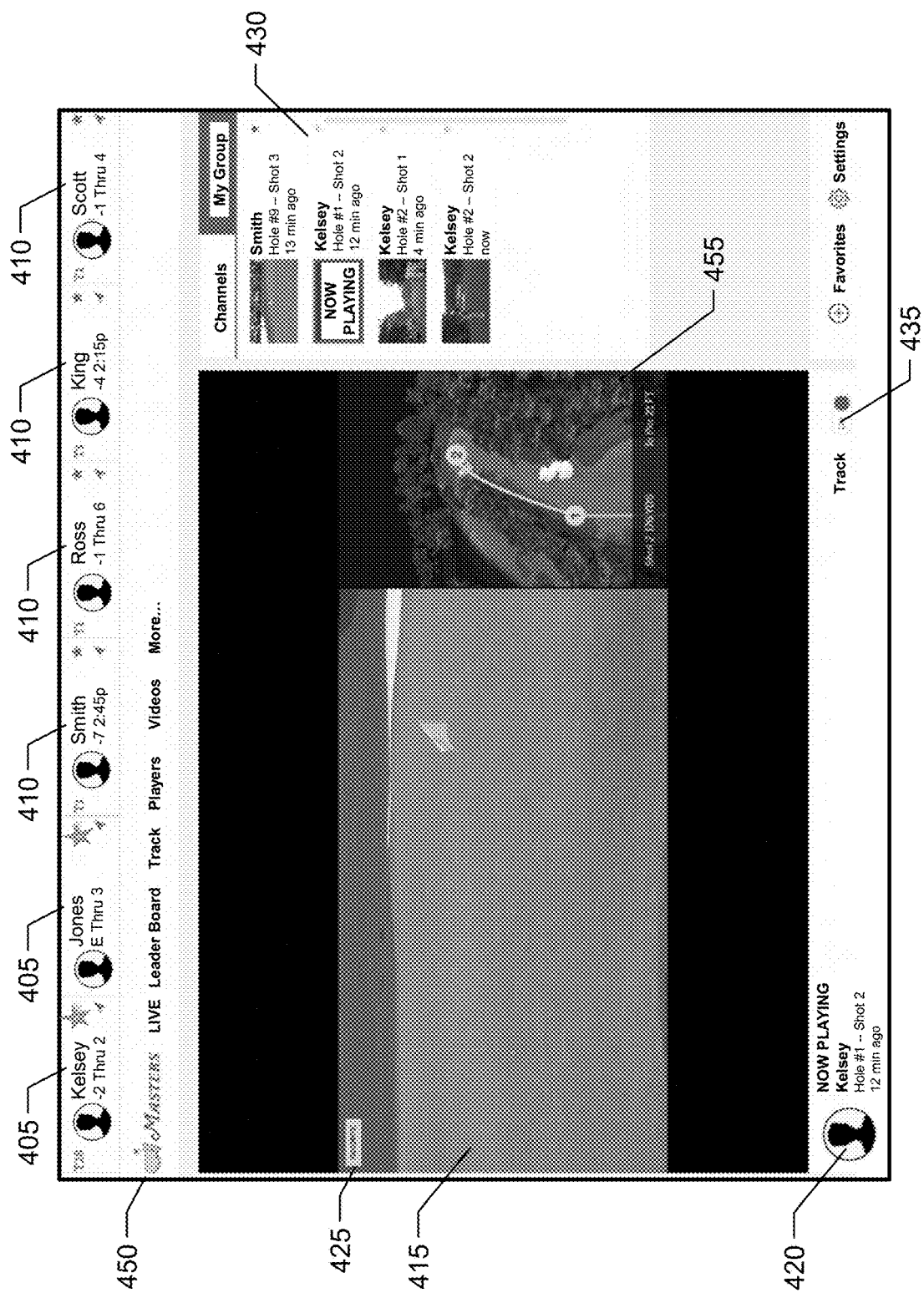
FIG. 15 illustrates an example embodiment of the interface with tracking on according to an example embodiment of the present disclosure.

Also shown in FIG. 14 is a "track" icon 435 which, when selected, depicts a map view for tracking. FIG. 15 illustrates an example embodiment of the interface 450 with the tracking on as selected at icon 435. The video segment displayed in the video frame 415 is unaffected by the track icon 435 other than a re-sizing of the video frame. A map view 455 is added by the track option using the track icon 435. The map view may be similar to that of FIG. 10, depicting the shot locations with numbered icons and the trajectories therebetween. The map view 455 may also include shot information such as the shot distance, distance to the hole, etc.

Video segments are placed into the queue shown in list 430 based on a hierarchy that is established, in part, based on a user's selection of favorites and settings. Video segments are added to the queue as they occur and can be removed from the queue after being played or after a time parameter elapses, as described below. During a round, the queue may be populated with each video segment of each selected player or "favorite" as they play. The queue is temporally arranged with the first shot to occur or first stroke from the first hole for a selected player. The video segments for the shots of the selected players are added to the queue as the players play and strokes are accumulated. A user may keep up with the pace of play, even while watching several selected players, since there is downtime between golf shots as players move to their ball and wait on players ahead of them. If the user is keeping up with the pace of play watching video segments of all of their selected players, the user may run out of video segments as there may be no new video segments for their selected players due to downtime between golf shots and course delays.

If a user runs out of video segments of golf shots of their selected players, video segments may be selected for the user and added to the queue. These video segments may be selected based on a user's settings. For example, if a user has "Great Shots" enabled as shown in FIG. 13, downtime between available video segments of their selected players may be filled by video segments of golf shots qualifying as great shots. Similarly, if they have "Course Leaders" enabled, video segments of the course leaders may be inserted to fill time until video segments of selected players are available.

If a user runs out of video segments of golf shots of their selected players, and either there are no unwatched Great Shots video segments or Course Leader video segments, or those settings are disabled, a leader board may be displayed in lieu of a video segment. Optionally, a leader board video may be shown on a loop until new video segment content is available.

A user may not be able to keep up the pace of video segments of golf shots of their selected players, particularly when there is a long list of selected players and they are all on the course at the same time. In such an instance, video segments may be removed from the queue based on a time parameter. For example, if a video segment for a shot is more than five minutes old, the video segment may be removed from the queue. This time parameter may be configurable to be as short or as long as a user may like. A user may not want any video segments dropped from their queue, such that the time parameter may be disabled or rendered moot by being very large.

Video segments may also be removed from the queue by virtue of a cumulative length of video segments in the queue. If the queue becomes very long in cumulative time (e.g., a 20-30 minute backlog of video segments), video segments may be removed. The video segments may be removed based on an age of the video segments (oldest segments removed first, for example), or based on other criteria. The criteria may prioritize video segments having great shots or very good shots, similar to the criteria for the "Great Shots" above but weighting the video segments based on the criteria rather than a binary decision on the shot of a video segment. Further, video segments of shots that are not deemed exciting may be removed from the queue. For example, a putt that is made from within two feet of the hole may be deemed routine and thus not necessary for showing to a user.

If a video queue becomes lengthy and a user skips several video segments on the list 430 to get to a selected video segment, the video segments above the selected video segment in the list (i.e., the video segments older than the selected video segment) may be removed from the queue and considered "previously viewed". A user may select a "previously viewed" video segment by either scrolling up the list 430 or selecting a "previously viewed" tab to see videos that were removed from the queue.

Figure 16:
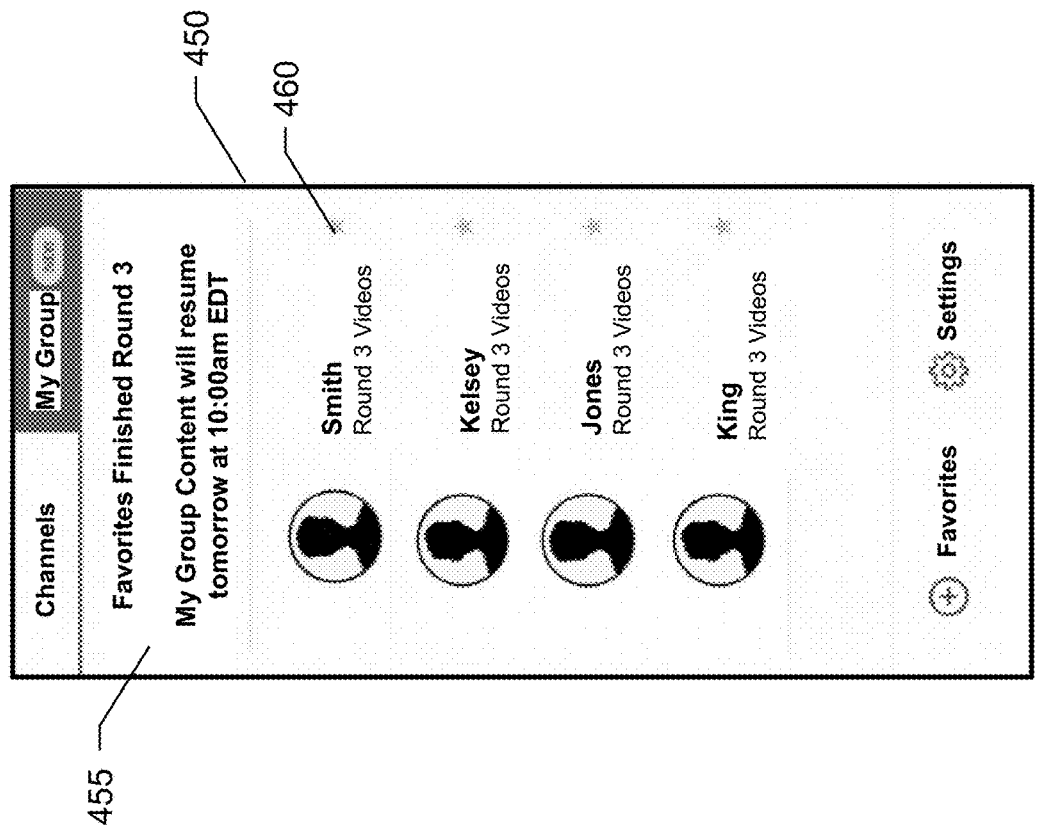
FIG. 16 illustrates an example embodiment of a user interface element that replaces a list or queue of video segments upon completion of a round according to an example embodiment of the present disclosure.

As players begin to finish their round, the number of video segments added to the queue decreases. As the video segments are watched or are otherwise removed from the queue, the remaining number of video segments in the queue will dwindle. Once the round is finished for the selected players, a message may be presented to a user indicating that their selected players are finished for the round. FIG. 16 illustrates an example embodiment of a user interface element 450 that replaces a list 430 or queue of video segments upon completion of a round. As shown, the list of selected "favorite" golfers is displayed, with each golfer identified (e.g., by name and/or by image) and at least one selectable option for each selected golfer is shown. In the illustrated embodiment, the "Round 3 videos" are available by selecting the text below the respective golfer's name. A message stating that "Favorites Finished Round 3" confirms that no new video segments will be presented for the current round, and an indicator of when content will resume is provided. A graphic depicting the selected players, their performance, and their place on the leaderboard may optionally be presented. Additional video segments of Great Shots and Course Leaders may continue until new Great Shots and new Course Leader video segments cease to be generated, such as when the round is finished. When no video segments remain, a message may be provided to a user that the round is complete and an indication of the next round (if any) may be shown along with tee times for the selected players, if known.

While example embodiments described herein are generally directed to golfing events, embodiments may be implemented in other types of sporting events. One such example is the Olympics, where many events occur simultaneously and a viewer may not be able to see all of the events they would like to view. According to an example embodiment, a user may select a subject that includes specific athletes, a particular country, or a type of sport, for example. Video segments corresponding to the selected subject may be gathered as events including those subjects occur. A queue of video segments relating to the selected subject or subjects may be presented to a user for viewing in a manner similar to that shown in FIGS. 14 and 15. For instance, if a user was keenly interested in viewing United States Olympic Athletes during the Olympics, as various events occur, the video segments containing videos of US Athletes competing may be queued for presentation to the user. The user may select only specific sporting events to narrow the scope of video segments presented.

Figure 17:
FIG. 17 illustrates an example embodiment of a comparison between golfers on a hole according to an example embodiment of the present disclosure.

Referring again to example embodiments of the present disclosure relating to golf, in addition to showing video segments of selected golfers, embodiments described herein enable a user to compare the performance of two or more golfers to one another. FIG. 17 illustrates an example embodiment of a comparison between golfers on a hole. The golfers may be the selected favorite golfers in My Group, and each of the golfers may be identified by a different color. In the illustrated embodiment, a first golfer 505 is identified by the color yellow next to their name, while a second golfer 510 is identified by the color blue, and a third golfer 515 is identified by the color green. Provided on the map view 500, shown elevated and behind the location of a tee box 520, are trajectories for the tee shots from each of the three golfers, with the trajectories in colors corresponding to the golfers, such as yellow trajectory 525. This is shown in the timeline view similar to that of FIG. 10 above; however, multiple golfers are depicted simultaneously for comparison. The timeline view can progress such as by using the "play" icon 530 where animations will illustrate the shots as the timeline moves from a start to the location of the first shot 535, then to a location of the second shot 540, and so on. Golfers can be removed from the comparison by de-selecting them such as by selecting the "x" in the respective golfer's information block shown for the first golfer 505, second golfer 510, and third golfer 515.

Figure 18:
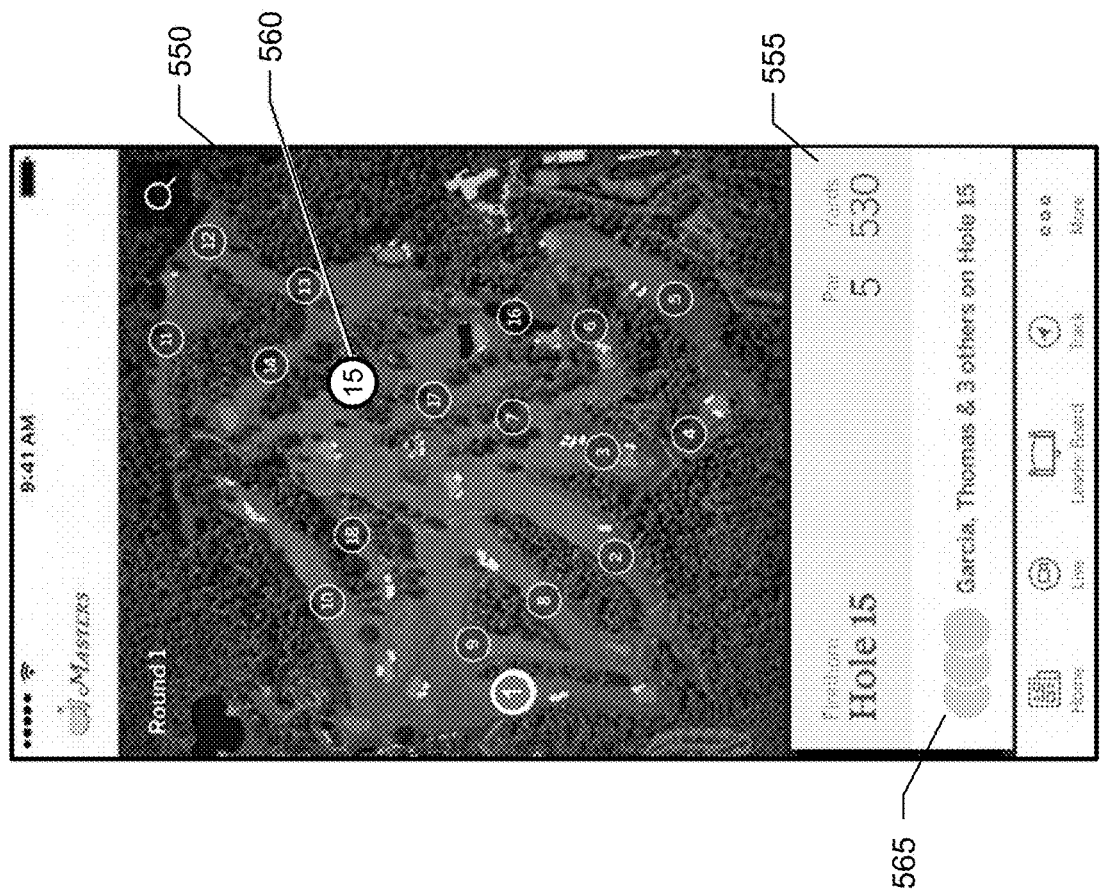
FIG. 18 illustrates a course map overview with a hole card providing information for a selected hole, shown with an icon on the map overview according to an example embodiment of the present disclosure.

FIG. 18 illustrates a course map overview 550 with a hole card 555 providing information for a selected hole, shown with icon 560 on the map overview 550. As shown, the hole number is indicated in the hole card 555 along with the par and total yards for the hole. Also shown are the golfers currently on the hole. A user can select the list of golfers 565 to present a listing of the golfers, whereby a user can select a specific golfer to view their progress (e.g., in a timeline view for the hole) or to view video of the golfer on the hole. Optionally, selection of the hole may present a map of the hole with icons on the map of the hole corresponding to the golfers. FIG. 19 illustrates an expanded hole card 570 including icons 575 for each golfer and their respective positions on the hole. From this expanded hole card, individual golfers can be selected, and their progress and available video segments viewed.

FIG. 20 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block (s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 20, includes receiving user input identifying at least one subject as shown at 610. A plurality of video segments associated with the at least one subject is received at 620. At least one of the plurality of video segments associated with the at least one subject is provided for display at 630. The video segment displayed may be displayed on the display of a device, such as mobile device 10 of FIG. 1, and may be presented in a video frame on the display of the device. At 640, at least one video segment not associated with at least one subject may be selected in response to the plurality of video segments associated with the at least one subject having been played or skipped. The video segment not associated with the at least one subject may be selected automatically based on available video segments. For example, a highlight video segment from event leaders may be presented if available. If multiple video segments not associated with the at least one subject are available, the video segments may be prioritized based on certain criteria, such as a level of interest determined in the video segments, where the level of interest may be established based on a quality of golf shots in the video segments, for example. The selected video is provided for display at 650. A new video segment associated with the at least one subject is received at 660 while the selected video segment that is not associated with the at least one subject is being displayed. At 670, the at least one video segment being displayed that is not associated with the at least one subject is followed or superseded with display of the new video segment in response to receiving the new video segment associated with the at least one subject.

In some embodiments, certain ones of the operations above may be modified or further amplified. Moreover, in some embodiments additional optional operations may also be included. It should be appreciated that each of the modifications, optional additions or amplifications below may be included with the operations above either alone or in combination with any others among the features described herein.

In an example embodiment, an apparatus for performing the method of FIG. 20 above may comprise a processor (e.g., the processor 70) configured to perform some or each of the operations (610-670) described above. The processor 70 may, for example, be configured to perform the operations (610-670) by performing hardware implemented logical functions, executing stored instructions, or executing algorithms for performing each of the operations. Alternatively, the apparatus may comprise means, such as the processor 70, the processor 70 and memory 76 storing computer program code, a computer program product or the like, for performing each of the operations described above.

An example of an apparatus according to an example embodiment may include at least one processor and at least one memory including computer program code. The at least one memory and the computer program code may be configured to, with the at least one processor, cause the apparatus to perform the operations 610-670 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 610-670 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving user input identifying at least one preferred player;
   receiving a plurality of video segments associated with the at least one preferred player, wherein the plurality of video segments comprise video segments of the at least one preferred player performing an athletic action;
   providing for display of at least one of the plurality of video segments associated with the at least one preferred player;
   providing for selection of at least one video segment that does not include the at least one preferred player in response to the plurality of video segments associated with the at least one preferred player having ended or been skipped;
   providing for display of the at least one video segment that does not include the at least one preferred player;
   receiving a new video segment of the at least one preferred player performing an athletic action while providing for display of the at least one video segment that does not include the at least one preferred player; and
   following or superseding display of the at least one video segment that does not include the at least one preferred player with display of the new video segment in response to receiving the new video segment associated with the at least one preferred player.

2. The method of claim 1, further comprising:
   providing for display of a plurality of user interface elements in a list adjacent to the at least one of the plurality of video segments provided for display, wherein the plurality of user interface elements correspond to respective video segments of the plurality of video segments associated with the at least one preferred player; and
   adding to the list a user interface element corresponding to another new video segment in response to receiving the another new video segment associated with the at least one preferred player.

3. The method of claim 1, wherein the at least one preferred player comprises at least one golfer, wherein the plurality of video segments associated with the at least one preferred player comprises a plurality of video segments of golf shots of the at least one golfer.

4. The method of claim 3, wherein receiving the plurality of video segments associated with the at least one preferred player comprises receiving the plurality of video segments of golf shots of the at least one golfer during a golfing event.

5. The method of claim 4, wherein receiving the new video segment associated with the at least one preferred player comprises receiving the new video segment associated with the at least one golfer in response to the at least one golfer completing a golf shot.

6. The method of claim 5, wherein providing for selection of at least one video segment that does not include the at least one preferred player in response to the plurality of video segments associated with the at least one preferred player having ended or been skipped comprises providing for selection of at least one video segment that does not include the at least one preferred player in response to all video segments of the plurality of video segments of golf shots of a current round of the golfing event having occurred in the past for the at least one preferred player having ended or been skipped by the user.

7. A computer program product comprising at least one non-transitory computer-readable storage medium having computer-executable program code portions stored therein, the computer-executable program code portions comprising program code instructions configured to:
provide for display of a plurality of players;
receive user input identifying at least one preferred player of the plurality of players;
determine a subset of video segments of a plurality of video segments, each video segment of the plurality of video segments comprising video of a player performing an athletic action and video segment information, wherein the video segment information comprises an indication of a player of the video segment and a context of the video segment, wherein the subset of video segments is determined based on the player of a respective video segment corresponding to the at least one preferred player; and
provide for display of the subset of video segments in an order based, at least in part, on respective contexts of video segments of the subset of video segments.

8. The computer program product of claim 7, wherein each video segment of the plurality of video segments comprises a video segment of a respective player performing an athletic action.

9. The computer program product of claim 8, wherein the athletic action comprises striking a golf ball with a golf club.

10. The computer program product of claim 9, wherein the context of a respective video segment comprises at least a stroke number, wherein the program code instructions configured to provide for display of the subset of video segments in an order based, at least in part, on the respective context of video segments of the subset of video segments are further configured to provide for display of the subset of video segments in an order based, at least in part, on the stroke number.

11. The computer program product of claim 10, further comprising program code instructions configured to:
during display of a respective video segment of the subset of video segments, provide for display of a map view adjacent to the display of the respective video segment, wherein the map view comprises a location where the respective video segment was captured.

12. The computer program product of claim 11, further comprising program code instructions configured to:
provide for display on the map view of a trajectory of the golf ball struck with the golf club in the respective video segment.

13. The computer program product of claim 11, wherein the program code instructions configured to provide for display of the subset of video segments in an order based, at least in part, on a respective context of video segments of the subset of video segments are further configured to provide for display of the subset of video segments based, at least in part, on the context of the respective video segments satisfying predetermined criteria.

14. The computer program product of claim 13, wherein the plurality of players comprises golfers, wherein each of the plurality of video segments comprises a video segment of a respective golfer striking a golf ball with a golf club as a golf shot, wherein the context of the respective video segment comprises information associated with the golf shot.

15. The computer program product of claim 14, wherein the predetermined criteria comprises a type of golf shot including:
a putt made from a distance greater than or equal to a predefined distance from a hole;
a golf shot with a golf ball landing within a predefined closeness distance to the hole from at least a predefined shot distance from the hole; or
a golf shot made into the hole to achieve two or more under par.

16. An apparatus comprising a display, wherein the apparatus is configured to:
provide for display of a plurality of players, wherein the players comprise golfers;
receive user input identifying at least one preferred player;
determine, from a plurality of video segments, a subset of video segments corresponding to the at least one preferred player, wherein the plurality of video segments comprises video segments of golf strokes, wherein the subset of video segments corresponding to the at least one preferred player comprises video segments of golf strokes performed by the at least one preferred player;
provide for presentation in a display window of the subset of video segments corresponding to the at least one preferred player, wherein the subset of video segments is provided for display in an order corresponding to an order of the golf strokes for the at least one preferred player;
provide for presentation of a map view window adjacent to the display window on the display; and
provide for presentation of a trajectory of a golf ball in the map view corresponding to a golf stroke of a respective video segment, where the trajectory of the golf ball in the map view provides a visual indication of a location and flight of the golf ball on a hole of a golf course.

17. The apparatus of claim 16, wherein the apparatus is further configured to:
provide for selection of at least one video segment that does not include the at least one preferred player in response to the subset of video segments associated with the at least one preferred player having ended or been skipped; and
provide for presentation of the at least one video segment does not include the at least one preferred player.

18. The apparatus of claim 17, wherein the apparatus is further configured to:
receive a new video segment associated with the at least one preferred player; and
provide for presentation of the new video segment.

19. The apparatus of claim 18, wherein the apparatus configured to provide for presentation of the new video segment is further configured to follow or supersede display of the at least one video segment that does not include the at least one preferred player.

20. The apparatus of claim 18, wherein the apparatus configured to receive the new video segment associated with the at least one preferred player is further configured to receive the new video segment associated with the at least one preferred player in response to the at least one preferred player completing a golf shot.

\* \* \* \* \*